(12) United States Patent
Yukumoto

(10) Patent No.: US 8,521,683 B2
(45) Date of Patent: Aug. 27, 2013

(54) IMAGE INPUT APPARATUS AND INFORMATION REGISTRATION METHOD

(75) Inventor: Reiji Yukumoto, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 887 days.

(21) Appl. No.: 11/972,278

(22) Filed: Jan. 10, 2008

(65) Prior Publication Data

US 2008/0208937 A1    Aug. 28, 2008

(30) Foreign Application Priority Data

Feb. 28, 2007 (JP) ................................. 2007-050670

(51) Int. Cl.
  *G06F 17/30* (2006.01)
(52) U.S. Cl.
  USPC .......................................... 707/609; 707/694
(58) Field of Classification Search
  USPC ................................... 707/609, 694
  See application file for complete search history.

(56) References Cited

U.S. PATENT DOCUMENTS

| | | | | |
|---|---|---|---|---|
| 7,215,434 | B1* | 5/2007 | Janse et al. | 358/1.15 |
| 7,644,119 | B1* | 1/2010 | Anooshfar | 709/203 |
| 2002/0107937 | A1 | 8/2002 | Iyoki | |
| 2003/0035140 | A1* | 2/2003 | Tomita et al. | 358/1.15 |
| 2006/0110171 | A1* | 5/2006 | Miyazawa et al. | 399/8 |
| 2007/0061474 | A1* | 3/2007 | Quach et al. | 709/229 |

FOREIGN PATENT DOCUMENTS

| | | |
|---|---|---|
| JP | 1-245785 | 9/1989 |
| JP | 2002-171333 | 6/2002 |
| JP | 2002-232637 | 8/2002 |
| JP | 2003-134157 | 5/2003 |
| JP | 2004-266686 | 9/2004 |

OTHER PUBLICATIONS

Office Action issued Aug. 30, 2011 in Japanese Patent Application No. 2007-050670.

* cited by examiner

*Primary Examiner* — Khanh Pham
*Assistant Examiner* — Johnese Johnson
(74) *Attorney, Agent, or Firm* — Oblon, Spivak, McClelland, Maier & Neustadt, L.L.P.

(57) ABSTRACT

A disclosed image input apparatus is connected via a network to one or more information processing apparatuses and is capable of registering multiple service entries at once according to a registration request sent from any one of the information processing apparatuses. The disclosed image input apparatus includes a service entry storage space; a service entry area reservation unit configured to reserve service entry areas in the service entry storage space; and a service entry update unit configured to register the service entries in the reserved service entry areas if available and to register the service entries in non-reservation areas of the service entry storage space if the reserved service entry areas are not available.

20 Claims, 18 Drawing Sheets

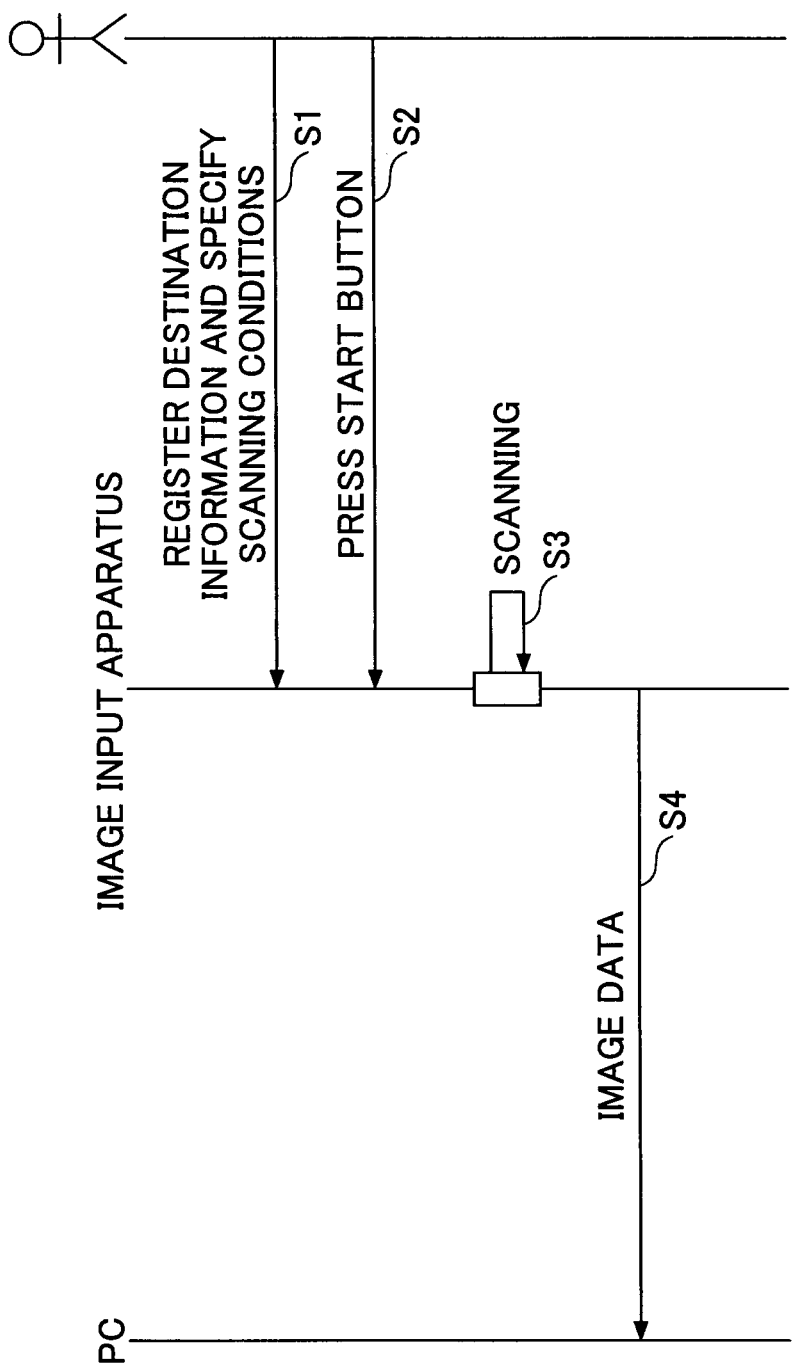

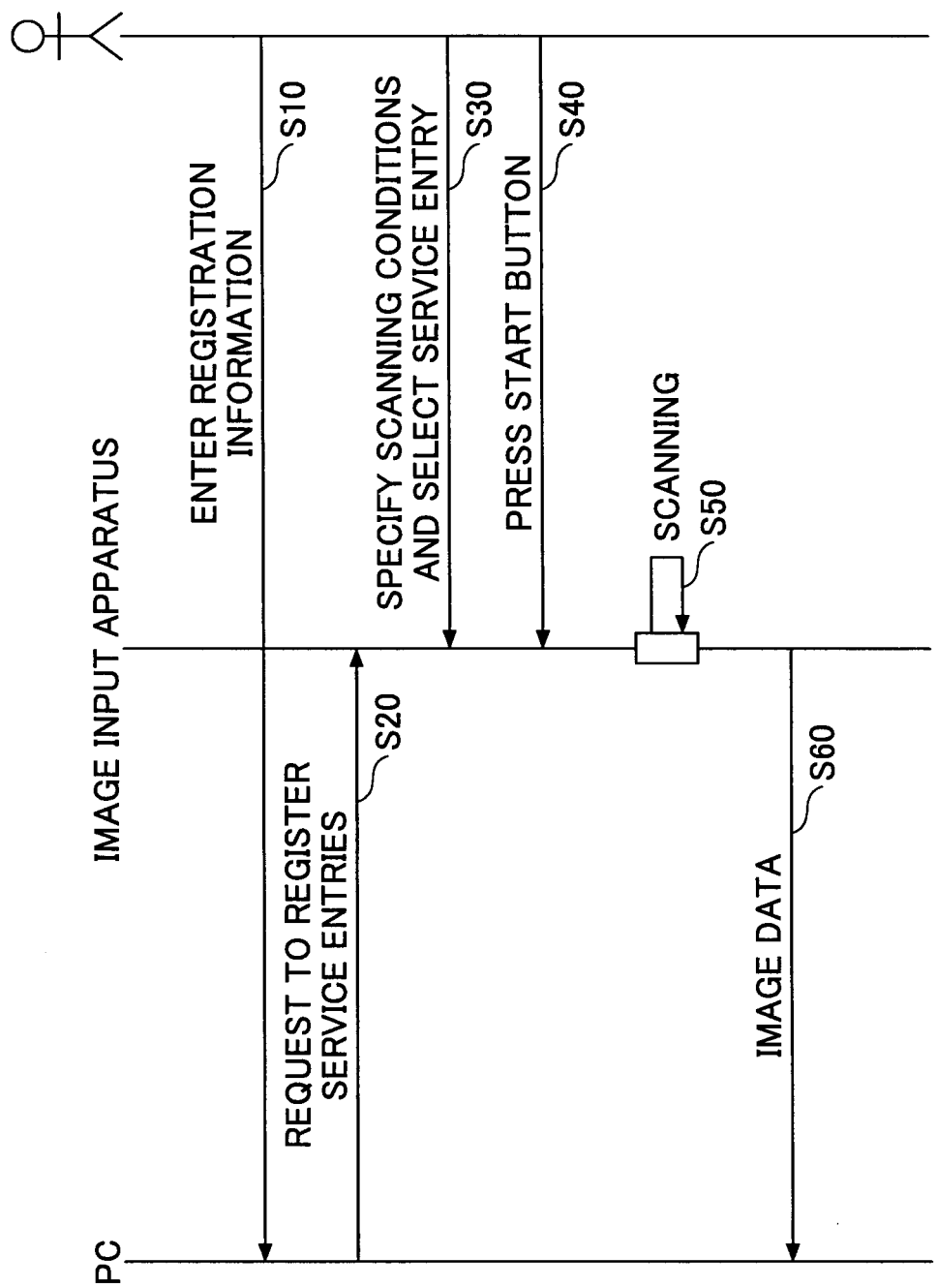

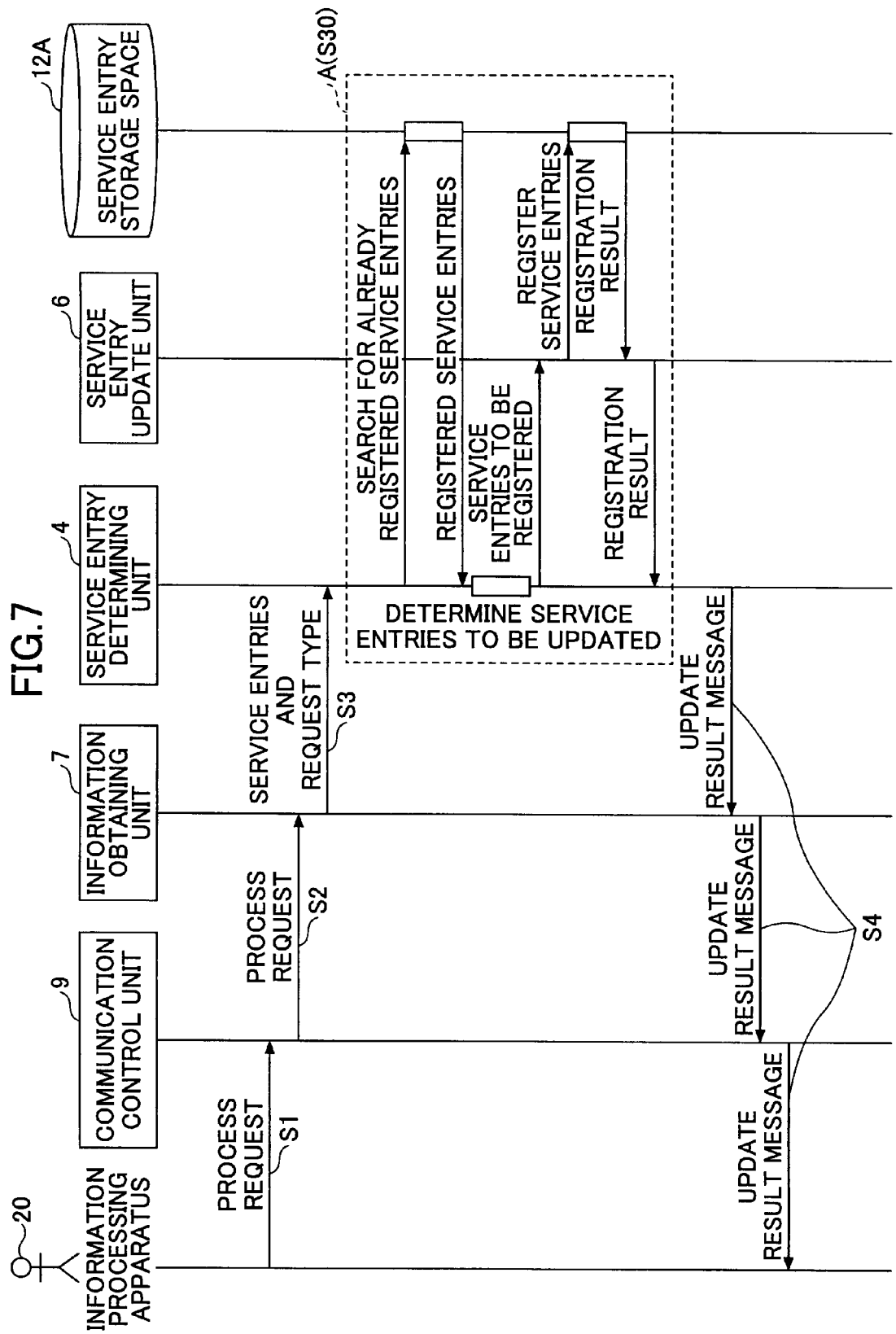

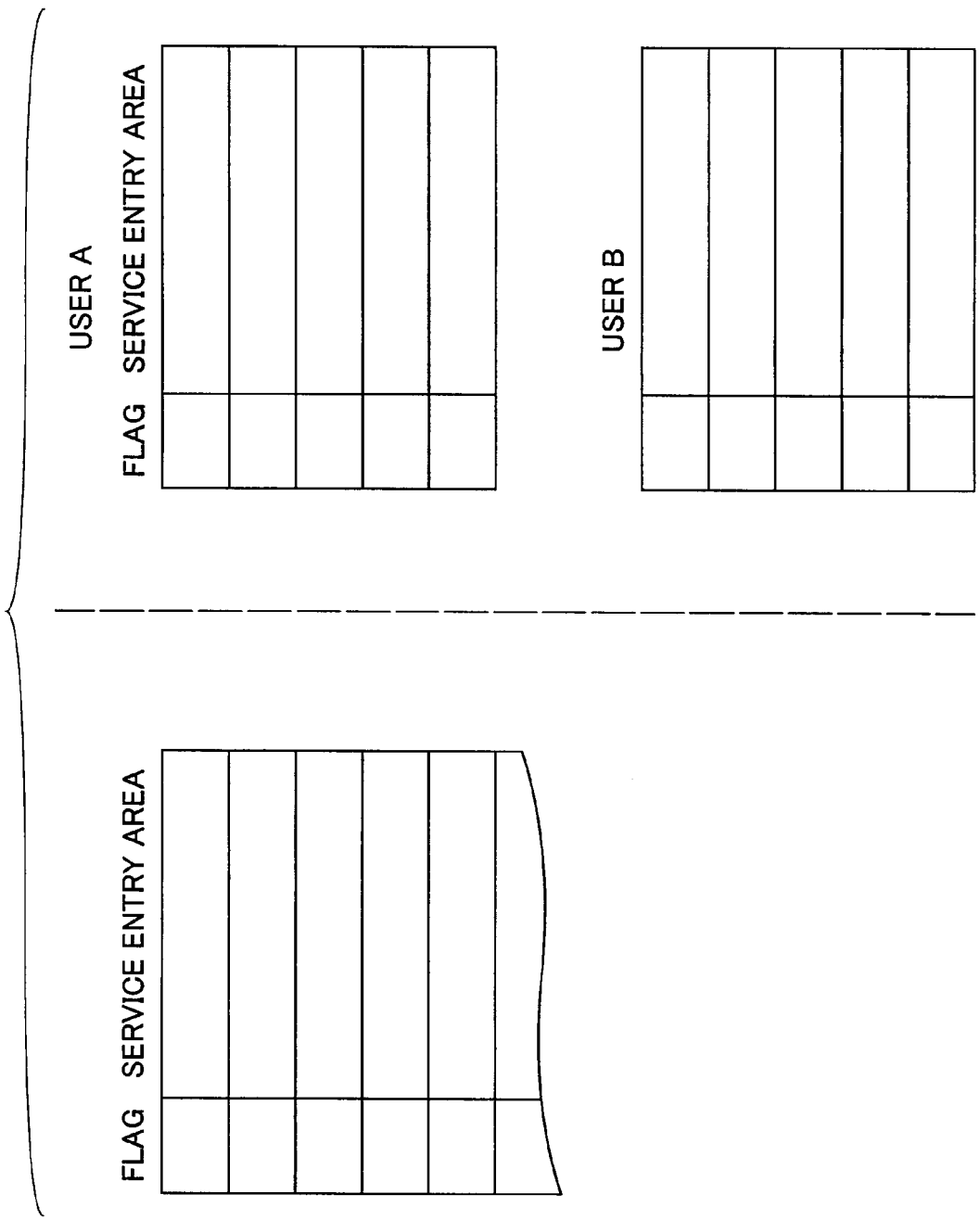

IMAGE INPUT APPARATUS AND INFORMATION REGISTRATION METHOD

BACKGROUND OF THE INVENTION

1. Field of the Invention

The present invention generally relates to an image input apparatus capable of registering information received from an information processing apparatus connected via a network. More particularly, the present invention relates to an image input apparatus capable of registering multiple sets of information received from an information processing apparatus connected via a network at once, and an information registration method in the image input apparatus.

2. Description of the Related Art

A "network scanner" connected to a network, such as a local area network (LAN), can be shared by multiple user terminals connected to the network. FIG. 16 is a drawing illustrating a configuration of an exemplary conventional network scanner system. The exemplary conventional network scanner system includes a network scanner 200, a delivery server 300, and a user terminal 400 that are connected to each other via a network. The delivery server 300 retains management data including the address (e.g. IP address) of the user terminal 400 in its internal memory. The management data are used to deliver image data to the user terminal 400. The delivery server 300 sends image data scanned by the network scanner 200 to the user terminal 400, which is specified when the scanning is requested, based on the management data retained in the internal memory and according to the server message block (SMB) protocol supported by its operating system (this mechanism is called "Scan to SMB").

Accordingly, to use the network scanner 200, it is necessary to specify information regarding a recipient user terminal 400 on the network scanner 200. However, it is bothersome to specify information regarding the user terminal 400 each time when making a scanning request. For this reason, the network scanner 200 is configured to allow the user to register user terminal information in its memory. The delivery server 300 retrieves the address of the user terminal 400 corresponding to the user terminal information in the network scanner 200 from the internal memory and sends image data to the retrieved address.

One problem with the above approach is that it is still bothersome to register user terminal information on a console of the network scanner 200, and another problem is that if a registered user terminal is not ON, delivery of image data results in failure. An operating system has been developed to solve these problems. The developed operating system automatically registers user terminal information of a running user terminal (where the operating system is installed) in a network scanner.

Meanwhile, the amount of memory of a network scanner usable for storing user terminal information is limited, and therefore it is not practical to store user terminal information of all user terminals in a network without limitation. Patent document 1 discloses an apparatus and a method for managing user terminal information in a memory. In the disclosed apparatus, user terminal information is managed as an address book stored in a memory. The disclosed apparatus identifies entries in the address book that have not been used for a long time based on their last accessed dates and removes the identified entries. Thus, the disclosed apparatus or method makes it possible to remove user terminal information that is currently not being used and thereby to improve memory use efficiency.

[Patent document 1] Japanese Patent Application Publication No. 2002-171333

A network scanner is shared by multiple users (user terminals), and therefore its memory for storing user terminal information is also shared by multiple users. One way to share the memory is to allocate an equal amount of memory area to each user. Meanwhile, user terminal information may include an information item regarding an application (e.g. an optical character recognition (OCR) application for handling text documents, a drawing program for handling graphics, etc.) that handles or receives image data sent from a delivery server or a network scanner in addition to the address of a user terminal and a folder location where image data are to be stored (such applications are hereafter called "services" and each set of user terminal information or destination information including an information item regarding a service is hereafter called a "service entry"). Assuming that a network scanner is configured to allow a user to register multiple service entries, the number of service entries may vary depending on the user. Also, even the same user may want to register different numbers of service entries depending on his/her current needs. In this case, allocating an equal amount of memory area to each user may not be practical.

Also in this case, it is preferable to automatically register service entries from a user terminal since it is bothersome to register a service entry, which includes various information items related to a user terminal, using a console of a network scanner. When using this approach, it is important to prevent a shortage of memory used for storing service entries. To prevent such a shortage of memory, the method disclosed in patent document 1 described above may be used.

However, when multiple service entries are registered at once by one registration request from a user terminal, it happens that some of the registered service entries are used frequently and others are not used at all. Therefore, it is preferable to incorporate in an image input apparatus a mechanism or a method for managing service entries taking into account the user terminals that have requested the registration of the service entries in addition to their last accessed dates and the number of registered service entries.

SUMMARY OF THE INVENTION

Embodiments of the present invention provide an image input apparatus and an information registration method in the image input apparatus that solve or reduce one or more problems caused by the limitations and disadvantages of the related art.

An embodiment of the present invention provides an image input apparatus connected via a network to one or more information processing apparatuses and capable of registering multiple service entries at once according to a registration request sent from any one of the information processing apparatuses. The image input apparatus includes a service entry storage space; a service entry area reservation unit configured to reserve service entry areas in the service entry storage space; and a service entry update unit configured to register the service entries in the reserved service entry areas if available and to register the service entries in non-reservation areas of the service entry storage space if the reserved service entry areas are not available.

Another embodiment of the present invention provides a method of registering multiple service entries at once in a service entry storage space of an image input apparatus connected via a network to one or more information processing apparatuses according to a registration request from any one of the information processing apparatuses. The method includes a service entry area reservation step of reserving service entry areas in the service entry storage space; and a service entry update step of registering the service entries in the reserved service entry areas if available or registering the service entries in non-reservation areas of the service entry storage space if the reserved service entry areas are not available.

BRIEF DESCRIPTION OF THE DRAWINGS

FIGS. 1A and 1B are sequence charts showing exemplary information registration processes;

FIG. 7 is a sequence chart showing a process of registering, deleting, or extending (the registration period of) service entries performed by corresponding units of an image input apparatus;

FIG. 8B shows an exemplary structure of a service entry storage space;

DESCRIPTION OF THE PREFERRED EMBODIMENTS

Figure 2:
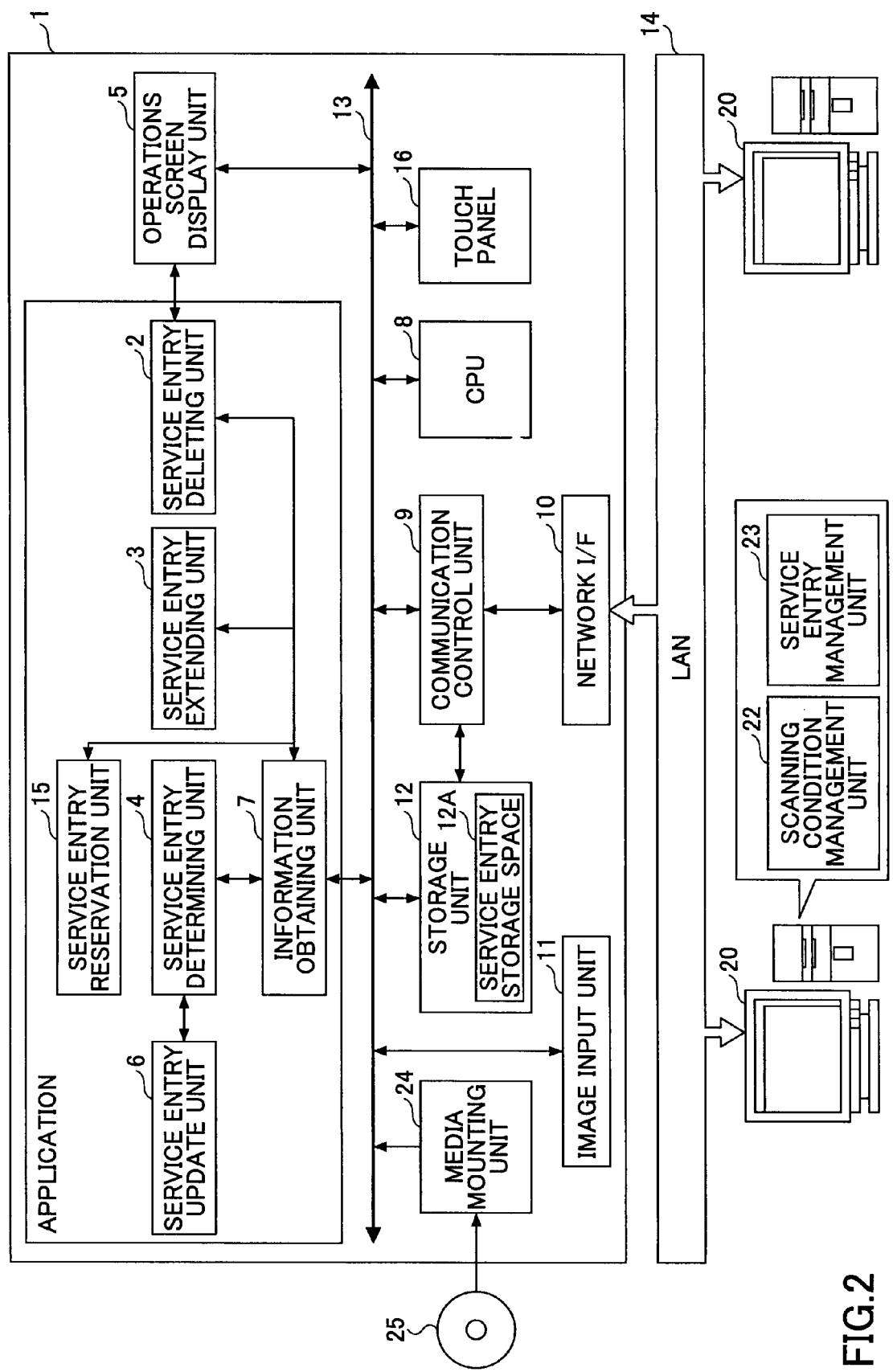
FIG. 2 is a drawing illustrating an exemplary configuration of an image input system including an image input apparatus and information processing apparatuses.

Preferred embodiments of the present invention are described below with reference to the accompanying drawings.

First, exemplary processes of registering information in an image input apparatus such as a network scanner are described. FIG. 1A is a sequence chart showing a conventional information registration process, and FIG. 1B is a sequence chart showing an exemplary information registration process according to an embodiment of the present invention.

Here, it is assumed that the image input apparatus is capable of sending scanned image data to a personal computer (PC) according to the SMB protocol. In FIG. 1A, the user registers, in advance, destination information including the name of the PC, its address, and the location of a folder in the PC on the image input apparatus. When requesting scanning of a document, the user specifies scanning conditions such as the scanning resolution (S1). Then, the user sets a document and presses a start button (S2). The image input device scans the document (S3) and sends the scanned image to the specified folder of the PC (S4).

As described above, in the conventional information registration process, the user (or an administrator) manually registers the destination information of the PC in the image input apparatus.

In an exemplary information registration process shown in FIG. 1B according to an embodiment of the present invention, the user enters registration information on the PC which registration information specifies service entries to be registered in the image input apparatus (S10). Default registration information including several service entries is preset in the OS running on the PC, and the user can add and delete service entries to and from the registration information. The PC requests the image input apparatus to register the service entries according to the registration information at a predetermined timing (S20). For example, the PC requests the image input apparatus to register the service entries at startup. The image input apparatus recognizes that the PC, i.e. a destination of image data, is ON by the request, and obtains destination information, such as an IP address, uniform resource identifiers, and services, of the PC from the service entries. Also, the image input apparatus may be configured to request the PC to make a registration request again when the image input apparatus is turned ON. The subsequent steps are substantially the same as in the conventional information registration process shown in FIG. 1A. The user specifies scanning conditions and selects one of the registered service entries (S30), and presses the start button (S40). The image input apparatus scans a document (S50), and sends scanned image data to the specified application or folder of the PC (S60).

In this embodiment, a service entry includes information regarding an application (or a service) provided in a PC in addition to a URI and an IP address of the PC. Therefore, one PC (a user, or a user terminal) may register multiple service entries corresponding to applications (services) in an image input apparatus. Also in this embodiment, the user does not have to enter all information items of a service entry as registration information in step S10. For example, the user enters only the name of a service entry, which name is displayed on the image input apparatus, a desired file format of scanned image data, and an application for handling the image data. Other information items in the service entry are automatically generated by the PC based on the registration information. This configuration makes it possible to reduce the workload of a user.

The following are examples of information items entered by the user as registration information:

Example 1

Name of service entry (e.g. application name)
File format: bitmap
Location of executable file (may be selected from a list) of
   OCR application for handling image data Example 2

Name of service entry (e.g. application name)
File format: JPEG
Location of executable file (may be selected from a list) of graphics application for handling image data The PC generates a service entry for each service based on registration information and stores the generated service entry in association with the corresponding application. For example, the PC associates the name of a service entry with the executable file of an application. Alternatively, the PC may be configured to generate a unique identifier for each service entry and to associate the identifier with the executable file of an application. This configuration makes it possible for a user to change the name of a service entry on the image input apparatus.

Thus, an embodiment of the present invention makes it possible for a PC to request an image input apparatus to register multiple service entries at once (by one request).

As described above, the amount of memory (hereafter called a service entry storage space) in an image input apparatus for storing service entries is limited. Therefore, an image input apparatus preferably has a mechanism to manage service entries in the service entry storage space based on the number of available areas (service entry areas) in the service entry storage space and the last accessed dates of the service entries.

An embodiment of the present invention provides an image input apparatus that allows a PC to reserve areas for service entries in the service entry storage space so that those service entries can be always registered.

FIG. 2 is a drawing illustrating an exemplary configuration of an image input system including an image input apparatus 1 and information processing apparatuses 20. As shown in FIG. 2, the image input apparatus 1 and the information processing apparatuses 20 are connected to each other via a network 14 such as a local area network (LAN) or a wide area network (WAN). Although the image input system shown in FIG. 2 includes multiple information processing apparatuses 20, the image input system may be composed of one image input apparatus 1 and one information processing apparatus 20.

In this embodiment, the image input apparatus 1 is implemented by a scanner and is configured to scan a document and send scanned image data to one of the information processing apparatuses 20. However, the present invention may be applied to other types of image input apparatuses such as a multifunction printer having functions of a copier, a fax machine, and a printer.

<Configuration of Image Input Apparatus>

The image input apparatus 1 includes a CPU 8, a communication control unit 9, a storage unit 12, an image input unit 11, a media mounting unit 24, a touch panel 16, and an operations screen display unit 5 that are connected to each other via a PCI bus 13. The communication control unit 9 is connected via a network interface (I/F) 10 to the network 14.

The CPU 8 controls the entire image input apparatus 1. For example, the CPU 8 controls image scanning by the image input unit 11, controls communications by the communication control unit 9, and handles user inputs from the touch panel 16. The operations screen display unit 5 controls display of screens on the touch panel 16. The image input unit 11 constitutes a scanning engine together with an image forming unit (not shown). The image input unit 11 scans a document line by line in the main-scanning direction and thereby scans the entire document in the sub-scanning direction at a specified resolution (e.g. 300 dpi), photoelectrically converts the scanned image of the document into an analog signal, and converts the analog signal to a digital signal with specified gradation levels (e.g. 8 bits). The image input unit 11 also performs image processing such as shading correction, gamma correction, and density correction on the scanned image.

The storage unit 12 includes a ROM, a RAM, and/or a hard disk, and stores application programs, data, and an operating system. A part of the storage unit 12 is allocated for a service entry storage space 12A for storing service entries.

The network I/F 10 provides the physical layer and the data link layer in the open system interconnection (OSI) model and enables communications with other network interfaces (e.g. network interface cards (NICs)) in the same network. Each of the information processing apparatuses 20 also includes a NIC. The image input apparatus 1 communicates with the information processing apparatuses 20 via the network I/F 10 using the TCP/IP protocol. The communication control unit 9 controls data transmission to/from the network 14. For example, the communication control unit 9 converts/constructs data into/from a signal suitable for transmission, and performs error-control procedures.

The media mounting unit 24 reads/writes data and programs from/to a mounted storage medium 25. Examples of the storage medium 25 include optical disks such as a compact disc (CD) and a digital versatile disk (DVD), a removable semiconductor memory, and a portable hard disk.

An enclosed area labeled "Application" in FIG. 2 includes an information obtaining unit 7, a service entry determining unit 4, a service entry update unit 6, a service entry extending unit 3, a service entry deleting unit 2, and a service entry area reservation unit 15. The units in the "Application" are implemented by executing programs by the CPU 8.

The information obtaining unit 7 extracts service entries from a registration request sent from the information processing apparatus 20. The service entry determining unit 4 determines whether the service entries extracted by the information obtaining unit 7 are already registered and thereby selects service entries to be registered. The service entry update unit 6 updates service entries in the service entry storage space 12A. The service entry extending unit 3 extends the registration period of service entries in the service entry storage space 12A. The service entry deleting unit 2 deletes service entries from the service entry storage space 12A. The service entry area reservation unit 15 reserves areas (service entry areas) for preferentially storing designated service entries in the service entry storage space 12A.

Programs for implementing the above units in "Application" may be installed from the storage medium 25 or downloaded via the network 14 onto the storage unit 12.

<Configuration of Information Processing Apparatus>

Figure 3:
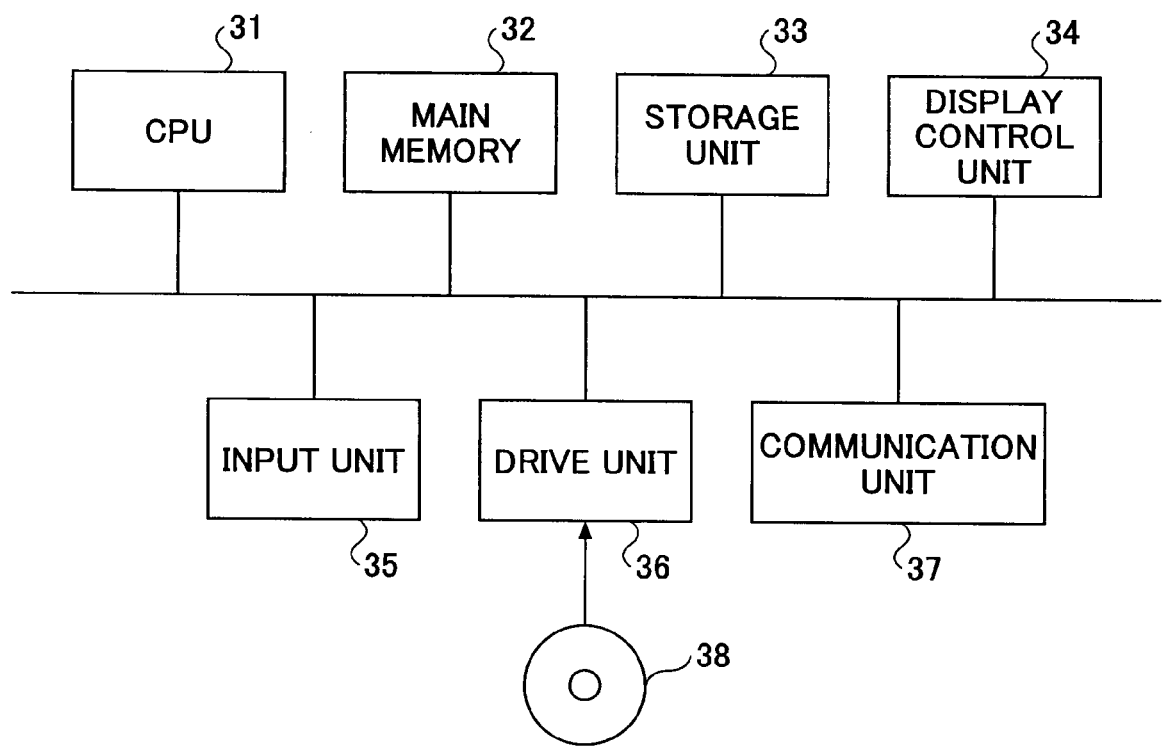
FIG. 3 is an exemplary hardware configuration of an information processing apparatus.

Each of the information processing apparatuses 20 is, for example, implemented by a personal computer or a work station. FIG. 3 is an exemplary hardware configuration of the information processing apparatus 20. In this embodiment, it is assumed that the information processing apparatus 20 is implemented by a personal computer.

The information processing apparatus 20 includes a CPU 31, a main memory 32, a storage unit 33, a display control unit 34, an input unit 35, a drive unit 34, and a communication unit 37 that are connected to each other via a bus.

The CPU 31 implements various functions of the information processing apparatus 20 and controls various processes in the information processing apparatus 20 by loading programs such as OS modules, applications, and drivers from the storage unit 33 into the main memory 32 and executing the loaded programs. The main memory 32 is implemented by, for example, a RAM and is used as a working memory for temporarily storing programs and data. The storage unit 33 is implemented by a non-volatile memory such as a hard disk drive (HDD) or a flash memory and is used to store programs and data. The display control unit 34 generates screens with specified resolutions and numbers of colors according to requests from programs, and displays the generated screens on a display such as a liquid crystal display. For example, the display control unit 34 generates graphical user interfaces (GUIs) displaying windows and data used for operations.

The input unit 35 includes, for example, a keyboard and a mouse, and is used to enter user instructions. The drive unit 36 accepts a storage medium 38. The drive unit 36 reads data from the storage medium 38 and sends the read data to, for example, the main memory 32. Also, the drive unit 36 writes programs and data onto the storage medium 38. The communication unit 37 is implemented by, for example, a modem or a NIC, and connects the information processing apparatus 20 to the network 14.

Referring back to FIG. 2, a scanning condition management unit 22 and a service entry management unit 23 of the information processing apparatus 20 are implemented by executing programs by the CPU 31. The service entry management unit 23 manages service entries. For example, the service entry management unit 23 generates service entries including destinations of image data based on default registration information or registration information specified by the user, and requests the image input apparatus 1 to register, delete, or extend (the registration period of) the service entries. The scanning condition management unit 22 manages scanning conditions, such as a document size, a resolution, and gradation levels, for a scanning operation on the image input apparatus 1 in association with a service entry. When a service entry is selected to make a scanning request, scanning conditions associated with the service entry are automatically specified in the scanning request.

<Operations of Image Input Apparatus>

When scanning a document, the user goes to the image input apparatus 1 and specifies a destination of scanned image data on an operations screen generated and displayed on the touch panel 16 by the operations screen display unit 5. The destination may be the information processing apparatus 20 of the user or of another user who has requested the user to scan the document. In this embodiment, a destination is registered in the image input apparatus 1 as a service entry including the name or the identifier of an application that receives and handles scanned image data. Therefore, the user can specify a destination by selecting a service entry represented, for example, by the name of an application on the operations screen.

The user can also specify scanning conditions (e.g., document size, resolution, and gradation levels), if necessary, on a screen displayed by the operations screen display unit 5. After the scanning conditions are specified, the image input apparatus 1 waits until a start button is pressed. When the user presses the start button, the image input apparatus 1 scans the document and sends the scanned image of the document to the specified destination (e.g. to an application of the information processing apparatus 20 specified in the selected service entry).

<Registration of Service Entries>

Figure 4:
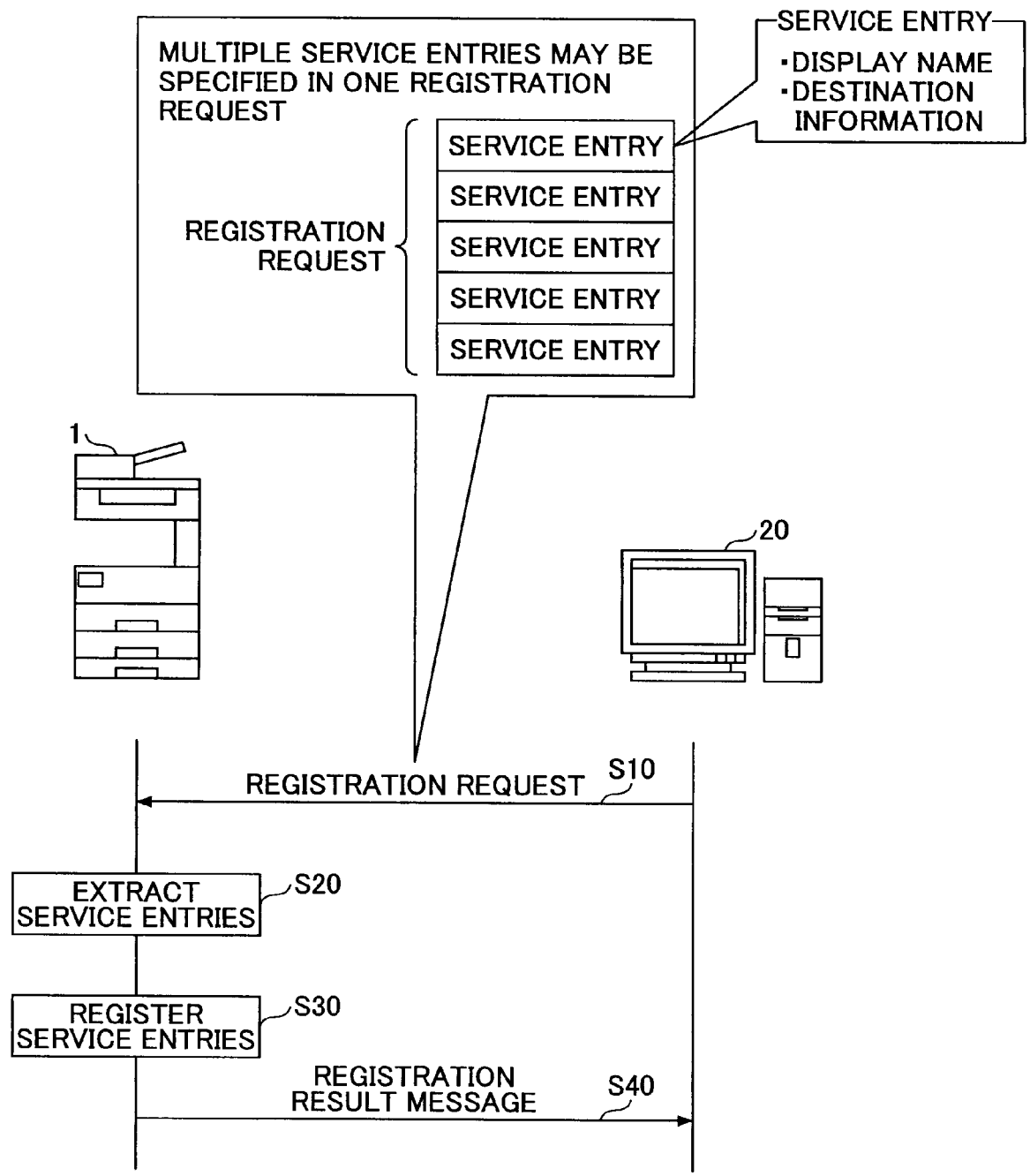
FIG. 4 is a drawing illustrating an exemplary process of registering service entries.

An exemplary process of registering service entries is described below. FIG. 4 is a drawing illustrating an exemplary process of registering service entries.

First, the user starts the service entry management unit 23 and enters registration information for service entries.

In this step, the user can specify a display name for each service entry to make it easier to identify the service entry on the image input apparatus 1. The display name represents a service entry on the operations screen displayed on the touch panel 16 by the operations screen display unit 5. For example, the name of an application or a service specified in a service entry may be used as the display name. The user can specify any display name for a service entry and also edit the display name later. Also, the service entry management unit 23 may be configured to generate and display a default display name for each service entry. The operations screen display unit 5 displays the display names of service entries on the touch panel 16 of the image input apparatus 1, and the user can specify a destination of scanned image data by selecting one of the display names. The service entry management unit 23 stores registration information entered by the user in the storage unit 33 and generates service entries based on the registration information.

Thus, in this embodiment, a service entry includes a display name and destination information including an IP address or a URI and a service (e.g. location of the executable file of an application). The service entry management unit 23 automatically enters the IP address of the corresponding information processing apparatus 20 when generating a service entry. Although a URI or an IP address is enough to identify the information processing apparatus 20, a service entry may also include an identifier for the information processing apparatus 20.

In this embodiment, it is assumed that the use of each of the information processing apparatuses 20 is restricted to a specific user by authentication. Therefore, in the descriptions below, the user and the information processing apparatus 20 may be used to have the same meaning.

In FIG. 4, the information processing apparatus 20 requests the image input apparatus 1 to register service entries generated as described above (S10). More specifically, the service information management unit 23 of the information processing apparatus 20 sends a registration request including all generated service entries to the image input apparatus 1.

Meanwhile, the registration request is sent to all image input apparatuses connected to the network 14. If the image input apparatus 1 is ON when the registration request is sent, the image input apparatus 1 registers the service entries specified in the registration request and becomes able to send image data to the information processing apparatus 20. On the other hand, when the image input apparatus 1 is turned ON, the image input apparatus 1 sends a registration prompting request prompting all information processing apparatuses connected to the network 14 to send registration requests. If the information processing apparatus 20 is ON when the registration prompting request is sent from the image input apparatus 1, the information processing apparatus 20 sends the registration request again to the image input apparatus 1. Thus, in this embodiment, the information processing apparatus 20 and the image input apparatus 1 send a registration request or a registration prompting request to the other when they are turned on. Alternatively, the information processing apparatus 20 and the image input apparatus 1 may be configured to send a registration request or a registration prompting request to the other at predetermined intervals.

As described above, the information processing apparatus 20 may register multiple service entries in the image input apparatus 1. In FIG. 4, it is assumed that five service entries are sent in a registration request to the image input apparatus 1.

When receiving a registration request via the network I/F 10, the image input apparatus 1 demodulates the registration request into digital data, extracts service entries from the digital data by removing headers, and temporarily stores the service entries in a RAM of the storage unit 12 (S20).

Then, the image input apparatus 1 registers the service entries (S30) and sends a registration result message (success or failure) to the information processing apparatus 20 (S40).

<Deletion of Service Entries>

An exemplary process of deleting service entries is described below. There are two cases where service entries are deleted. In one case, the information processing apparatus 20 requests the image input apparatus 1 to delete service entries. In the other case, the image input apparatus 1 deletes service entries if no extension request for extending the registration period of the service entries is sent from the information processing apparatus 20 for a certain period of time.

Deleting Service Entries by Request

Figure 5:
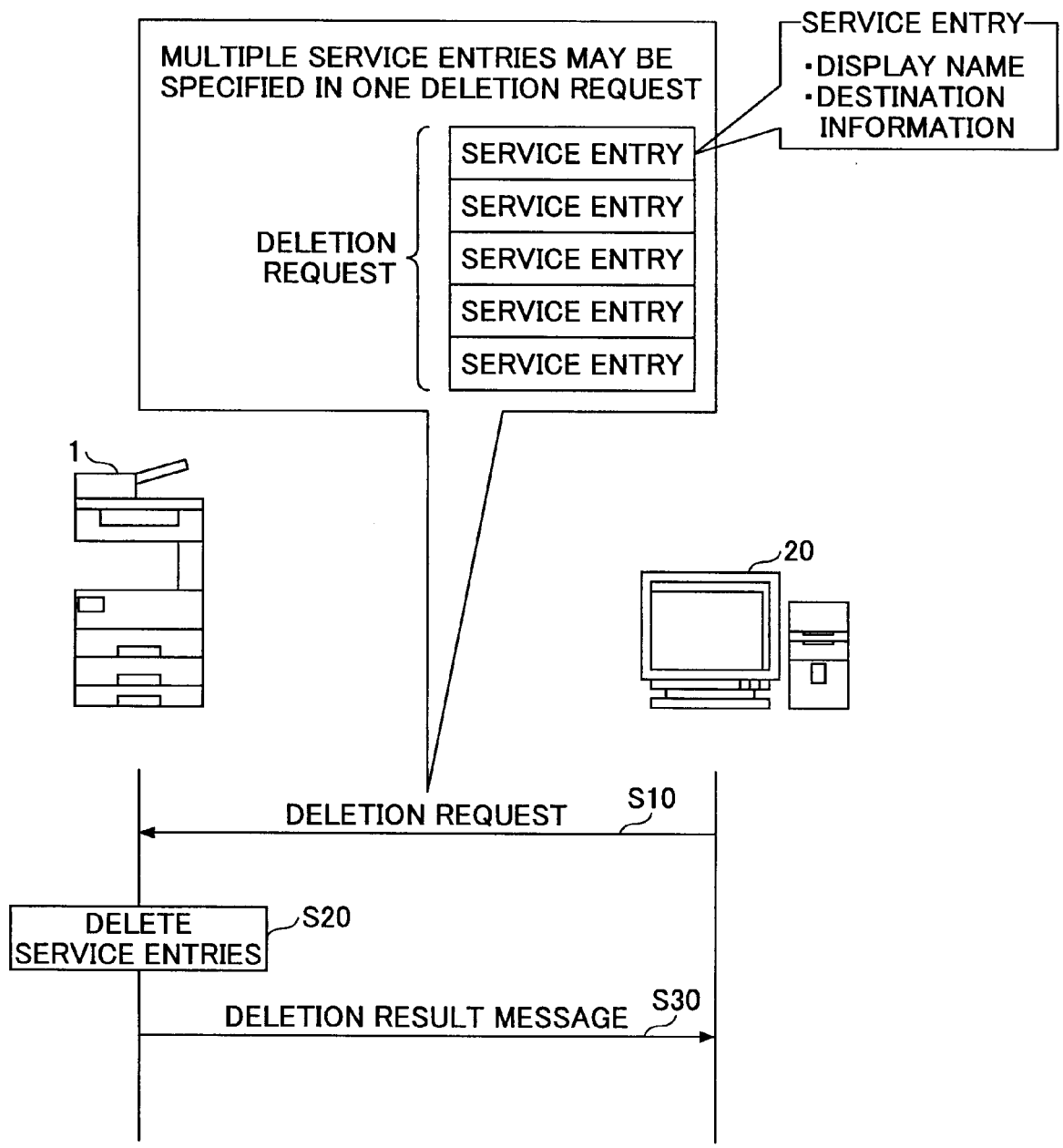
FIG. 5 is a drawing illustrating an exemplary process of deleting service entries.

FIG. 5 is a drawing illustrating an exemplary process of deleting service entries in response to a deletion request from the information processing apparatus 20.

Here, it is assumed that service entries of the information processing apparatus 20 are already registered in the image input apparatus 1. Before being shut down or turned OFF normally, the information processing apparatus 20 sends a deletion request for deleting service entries to the image input apparatus 1 since it cannot receive image data from the image input apparatus 1 after it is shut down.

The service entry management unit 23 of the information processing apparatus 20 sends a deletion request including registered service entries to the image input apparatus 1 (S10). As shown in FIG. 5, multiple service entries can be specified in a deletion request.

When receiving the deletion request, the image input apparatus 1 deletes service entries corresponding to those in the deletion request (S20), and sends a deletion result message (success or failure) to the information processing apparatus 20 (S30). This deletion sub-process (step S20) is described later in more detail.

In step S20 above, even if the service entries in the deletion request do not exactly match the service entries registered in the image input apparatus 1 for the information processing apparatus 20, the image input apparatus 1 deletes all registered service entries of the information processing apparatus 20.

Deleting Service Entries when No Extension Request is Received

As described above, before being shut down normally, the information processing apparatus 20 sends a deletion request to the image input apparatus 1. However, if the information processing apparatus 20 is shut down abnormally, service entries of the information processing apparatus 20 remain on the image input apparatus 1 and waste memory areas in the service entry storage space 12A. To obviate this problem, the image input apparatus 1 is configured to delete service entries of an information processing apparatus 20 if no extension request is sent from the information processing apparatus 20 for a predetermined period of time. This makes it possible to efficiently use the service entry storage space 12A.

Figure 6:
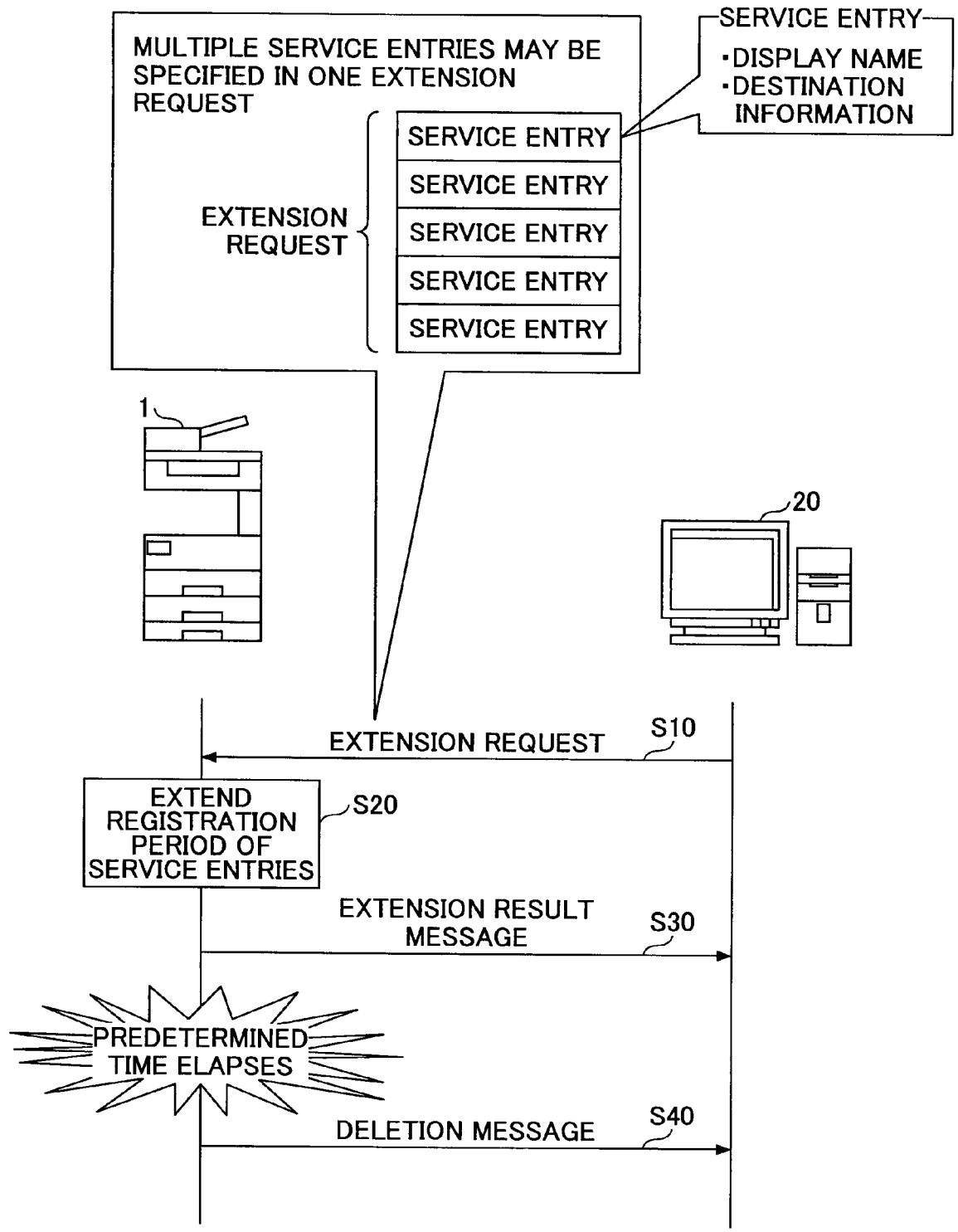
FIG. 6 is a drawing illustrating an exemplary process of extending the registration period of service entries.

FIG. 6 is a drawing illustrating an exemplary process of extending the registration period of service entries in response to an extension request from the information processing apparatus 20.

Here, it is assumed that service entries of the information processing apparatus 20 are already registered in the image input apparatus 1. Also, it is assumed that extension requests are made automatically by the service entry management unit 23 at predetermined intervals.

The service entry management unit 23 of the information processing apparatus 20 sends an extension request including registered service entries to the image input apparatus 1 after a predetermined period of time (S10). Alternatively, the service entry management unit 23 may be configured to send only an extension request including no service entry and thereby to request the image input apparatus 1 to extend the registration period of all registered service entries of the information processing apparatus 20.

When receiving the extension request, the image input apparatus 1 extends the registration period of registered service entries corresponding to those in the extension request (S20), and sends an extension result message (success or failure) to the information processing apparatus 20 (S30). For example, the image input apparatus 1 resets a timer assigned to the information processing apparatus 20 to extend the registration period. If the time measured by the timer exceeds a predetermined value, the image input apparatus 1 deletes the service entries of the information processing apparatus 20. After deleting service entries according to the timer, the image input apparatus 1 sends a deletion message to the information processing apparatus 20 (S40).

<Detailed Process of Managing Service Entries>

A detailed process of managing service entries is described below. FIG. 7 is a sequence chart showing a process of registering, deleting, or extending (the registration period of) service entries performed by corresponding units of the image input apparatus 1. Compared with a process of deleting or extending (the registration period of) service entries, the process of registering service entries is rather complicated. In a registration process, the number of service entries to be registered and the number of available service entry areas in the service entry storage space 12A must be taken into account.

In FIG. 7, the information processing apparatus 20 sends a process request (registration, deletion, or extension request) including service entries to the image input apparatus 1 (S1).

When receiving the process request, the communication management unit 9 of the image input apparatus 1 demodulates the request into digital data and sends the digital data to the information obtaining unit 7 (S2).

The information obtaining unit 7 extracts service entries and a request type from the digital data and sends them to the service entry determining unit 4 (S3). A request type indicates the type of a process (registration, deletion, or extension) requested.

The service entry determining unit 4 compares the service entries extracted from the request with the service entries already registered in the image input apparatus 1, and thereby determines service entries to be updated (registered, deleted, or extended). After service entries to be updated are determined by the service entry determining unit 4, the service information update unit 6 updates the contents in the service entry storage space 12A.

Then, the service information update unit 6 sends an update result message (success or failure) via the service entry determining unit 4, the information obtaining unit 7, and the communication control unit 9 to the information processing apparatus 20 (S4).

In FIG. 7, an area surrounded by a dotted line A (S30) shows exemplary steps of registering service entries in the service entry storage space 12A. In the registration steps, the image input apparatus 1 determines whether service entry areas in the service entry storage space 12A are reserved for the service entries in a registration request. Next, an exemplary process of reserving service entry areas is described.

<Reservation of Service Entry Areas>

The information processing apparatus 20 can designate service entries and request the image input apparatus 1 to reserve service entry areas in the service entry storage space 12A for the designated service entries. Service entries other than the designated service entries cannot be registered in the reserved service entry areas. This mechanism makes it possible for the information processing apparatus 20 to register the designated service entries at any time.

Figure 8A:
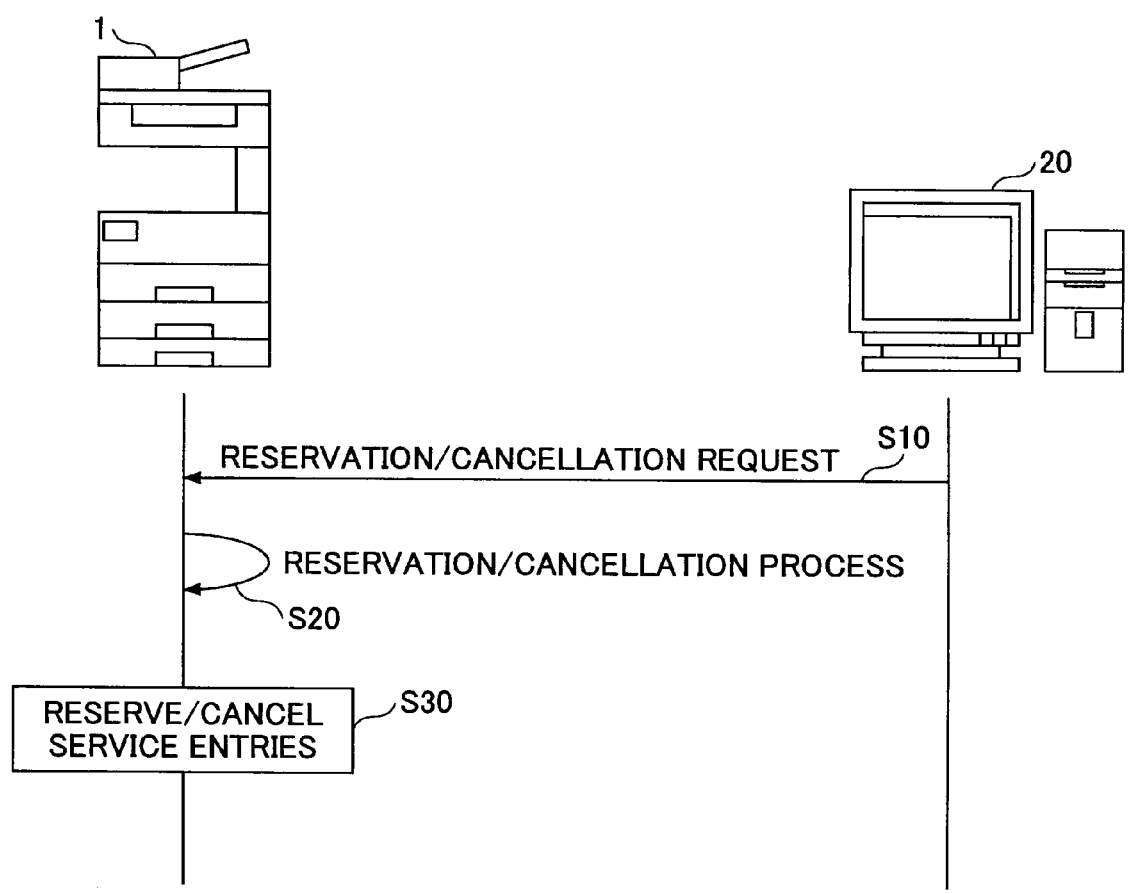
FIG. 8A is a drawing illustrating an exemplary service entry area reservation/cancellation process.

FIG. 8A is a drawing illustrating an exemplary service entry area reservation/cancellation process. The information processing apparatus 20 sends a reservation/cancellation request for reserving/cancelling service entry areas to the image input apparatus 1 (S10). When receiving the reservation/cancellation request, the image input apparatus 1 performs a reservation/cancellation sub-process described later (S20). As a result, service entry areas are reserved/cancelled (S30).

FIG. 8B shows an exemplary structure of the service entry storage space 12A. Each service entry area in the service entry storage space 12A has a flag indicating whether the service entry area is reserved. If the flag is ON (1), it indicates that the service entry area is reserved; if the flag is OFF (0), it indicates that the service entry area is not reserved.

In this embodiment, a maximum number of reservable service entry areas is set for each of the information processing apparatuses 20 (i.e. each user) or for the image input apparatus 1 (as a total maximum number for all the users) to prevent all service entry areas in the service entry storage space 12A from being reserved. When a maximum number of reservable service entry areas is set for each user, reserved service entry areas are assigned to the respective users. When a maximum number of reservable service entry areas is set for the image input apparatus 1, reserved service entry areas are assigned to the respective service entries.

Setting a maximum number of reservable service entry areas for the image input apparatus 1 makes it possible to flexibly reserve service entry areas for important (or often-used) service entries. On the other hand, setting a maximum number of reservable service entry areas for each user makes it possible for the user to use reserved service entry areas even when the corresponding service entries are modified. If a service entry is modified, it is treated as a different service entry. Therefore, the service entry area assigned to the service entry becomes unusable. Setting a maximum number of reservable service entry areas for each user makes it possible to solve this problem. That is, since service entry areas are assigned to a user, the user can use the service entry areas even when the service entries are modified.

Figure 9:
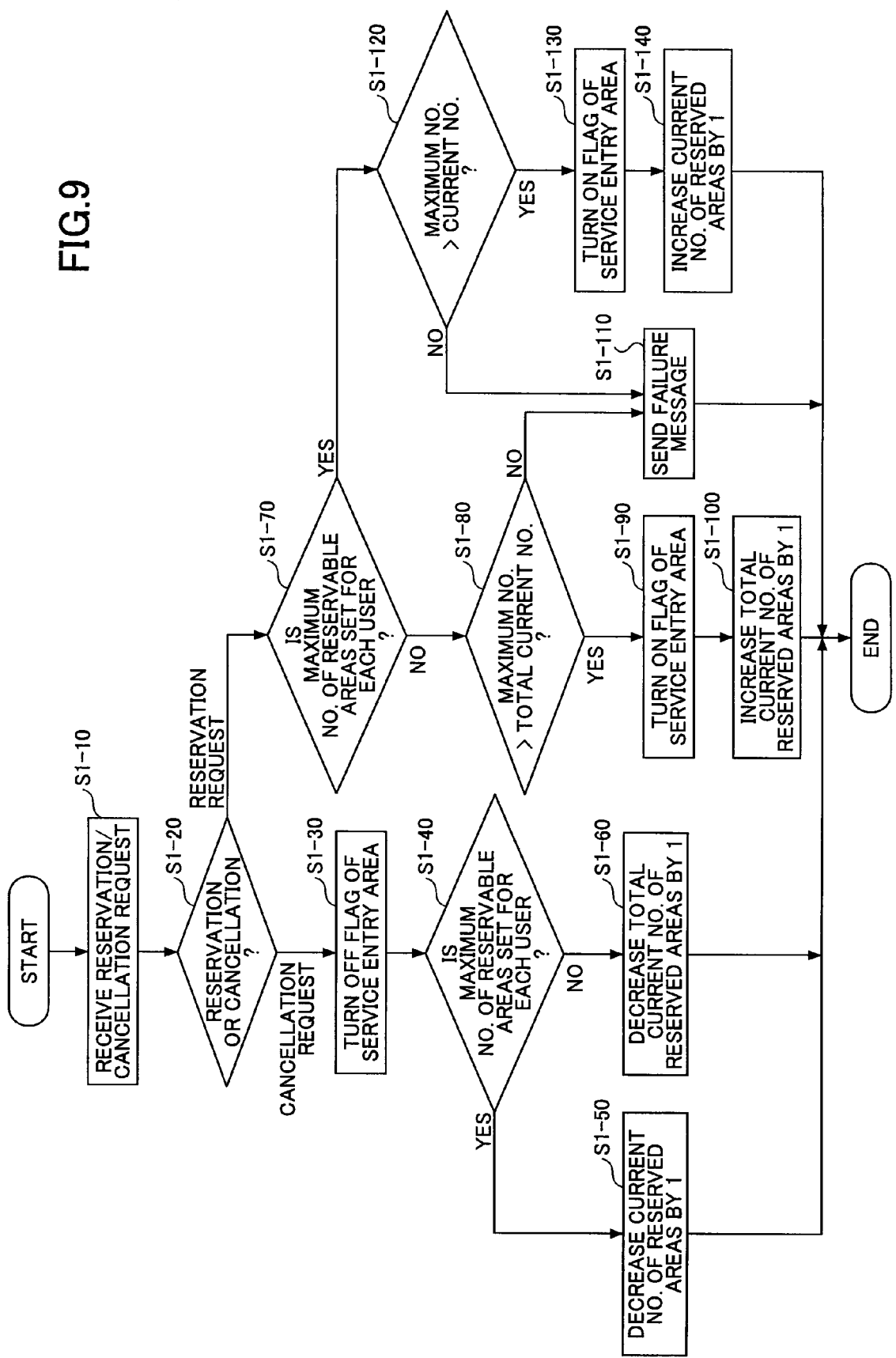
FIG. 9 is a flowchart showing an exemplary service entry area reservation process performed by a service entry area reservation unit.

FIG. 9 is a flowchart showing an exemplary reservation/cancellation process performed by the service entry area reservation unit 15. The exemplary process shown in FIG. 9 makes it possible for the information processing apparatus 20 to designate service entries and to reserve service entry areas for the designated service entries. This in turn makes it possible for the image input apparatus 1 to register the designated service entries without deleting already registered service entries.

As described above, service entry areas reserved for designated service entries are not usable for registering other service entries.

In FIG. 9, the service entry area reservation unit 15 receives a reservation/cancellation request for a designated service entry from the information processing apparatus 20 (S1-10). Then, the service entry area reservation unit 15 determines whether the received request is a reservation request or a cancellation request (S1-20).

If the request is a cancellation request, the service entry area reservation unit 15 turns OFF the flag of the service entry area assigned to the designated service entry (S1-30).

After step S1-30, the service entry area reservation unit 15 determines whether the maximum number of reservable service entry areas is set for each user (i.e. the information processing apparatus 20) (or for the image input apparatus 1) (S1-40).

If the maximum number of reservable service entry areas is set for each user (YES in step S1-40), the service entry area reservation unit 15 decreases the current number of reserved service entry areas of the user by 1 (by the number of cancelled service entry areas) (S1-50).

If the maximum number of reservable service entry areas is set for the image input apparatus 1 (NO in step S1-40), the service entry area reservation unit 15 decreases the total current number of reserved service entry areas of the image input apparatus 1 by 1 (by the number of cancelled service entry areas) (S1-60).

If the request is a reservation request in step S1-20, the service entry area reservation unit 15 determines whether the maximum number of reservable service entry areas is set for each user (i.e. the information processing apparatus 20) (or for the image input apparatus 1) (S1-70).

If the maximum number of reservable service entry areas is set for the image input apparatus 1 (NO in step S1-70), the service entry area reservation unit 15 determines whether the total current number of reserved service entry areas of the image input apparatus 1 is smaller than the maximum number of reservable service entry areas (S1-80). Meanwhile, if no maximum number of reservable service entry areas is specified in the image input apparatus 1, step S1-80 is omitted and the process goes to step S1-90.

If the total current number of reserved service entry areas is smaller than the maximum number of reservable service entry areas (YES in step S1-80), the service entry area reservation unit 15 turns ON the flag of a service entry area of the designated service entry (S1-90). Then, the service entry area reservation unit 15 increases the total current number of reserved service entry areas of the image input unit 1 by 1 (by the number of newly reserved service entry areas) (S1-100). If the total current number of reserved service entry areas is equal to or larger than the maximum number of reservable service entry areas (NO in step S1-80), the service entry area reservation unit 15 sends a failure message to the information processing apparatus 20 (S1-110).

If the maximum number of reservable service entry areas is set for each user (YES in step S1-70), the service entry area reservation unit 15 determines whether the current number of reserved service entry areas of the user is smaller than the maximum number of reservable service entry areas (S1-120). Meanwhile, if no maximum number of reservable service entry areas is specified in the image input apparatus 1, step S1-120 is omitted and the process goes to step S1-130.

If the current number of reserved service entry areas of the user is equal to or larger than the maximum number of reservable service entry areas (NO in step S1-120), the service entry area reservation unit 15 sends a failure message to the information processing apparatus 20 (S1-110).

If the current number of reserved service entry areas of the user is smaller than the maximum number of reservable service entry areas (YES in step S1-120), the service entry area registration unit 15 turns ON the flag of a service entry area for the designated service entry (S1-130).

Then, the service entry area reservation unit 15 increases the current number of reserved service entry areas of the user by 1 (by the number of newly reserved service entry areas) (S1-140).

<Reservation Areas and Non-Reservation Areas>

Figure 10:
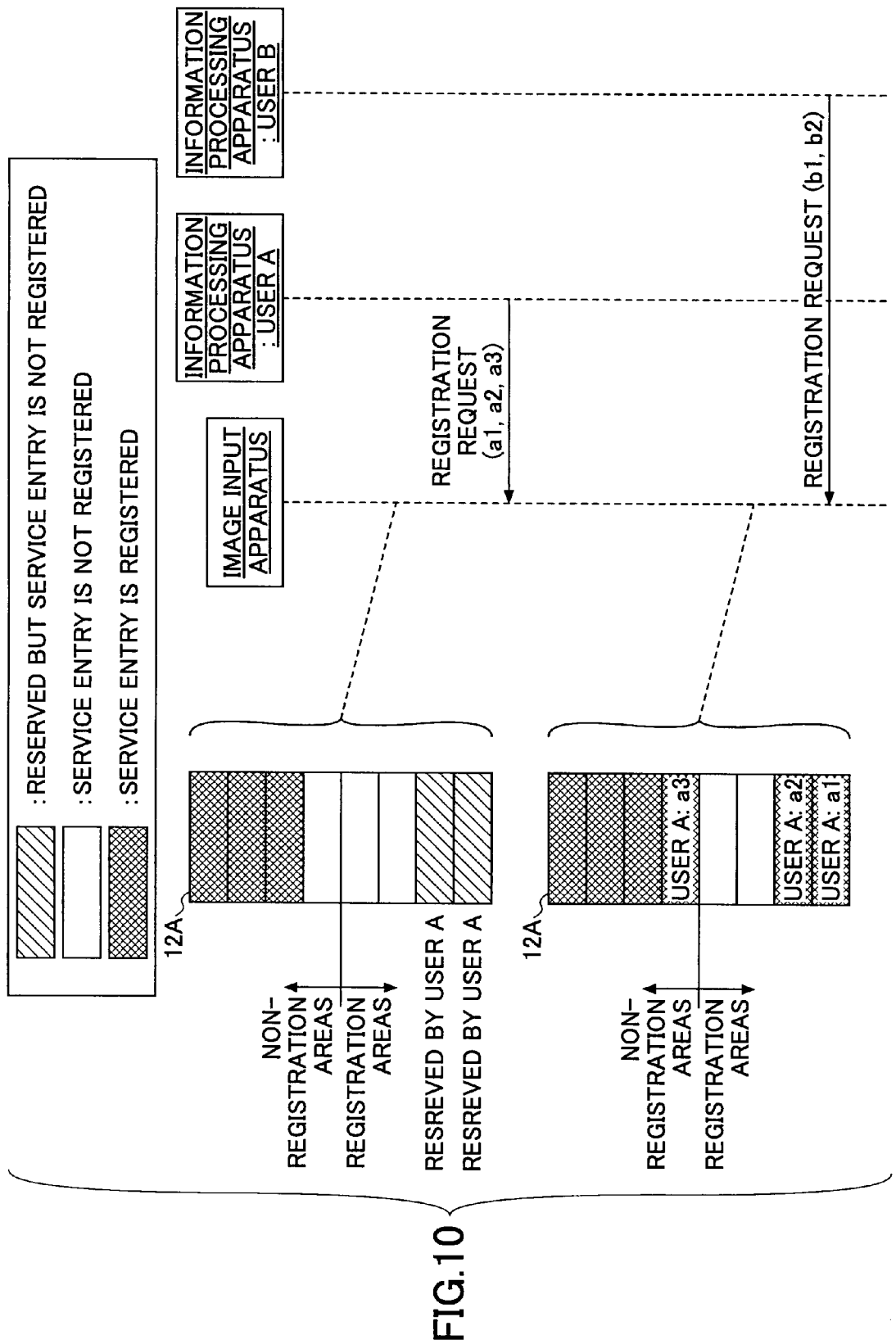
FIG. 10 is a drawing illustrating an exemplary process where registration of service entries exceeding the number of available service entry areas in a service entry storage space is requested by users A and B.

Service entry areas in the service entry storage space 12A are classified into reservation areas available for reservation and non-reservation areas not available for reservation. Handling of the reservation areas and the non-reservation areas is described below. FIG. 10 is a drawing illustrating an exemplary process where registration of service entries exceeding the number of available service entry areas in the service entry storage space 12A is requested by users A and B.

Exemplary statuses of the service entry storage space 12A are shown in the left side of FIG. 10. In the service entry storage space 12A shown in FIG. 10, a hatched area indicates a reserved service entry area where no service entry has been registered yet, a white area indicates a service entry area where no service entry has been registered yet, and a cross-hatched area indicates a service entry area where a service entry is registered. In the upper example of the service entry storage space 12A, two service entry areas are reserved for service entries a1 and a2 of user A.

If user A requests the image input apparatus 1 to register service entries a1 through a3, the service entries a1 and a2 are registered in the reserved service entry areas and the service entry a3 is registered in a white area in the non-reservation areas.

As a result, the status of the service entry storage space 12A changes as shown by the lower example in FIG. 10.

If user B further requests the image input apparatus 1 to register service entries b1 and b2, the image input apparatus 1 tries to secure service entry areas by deleting service entries in the non-reservation areas. For example, if the service entry a3 of user A is the least recently used entry, the image input apparatus 1 tries to delete the service entry a3 to secure a service entry area for a new service entry. However, since the service entry a3 is registered at the same time (by the same information processing apparatus or user) as the service entries a1 and a2 registered in the reserved service entry areas, the image input apparatus 1 tries to delete a service entry in a non-reservation area other than the service entry a3.

Figure 11:
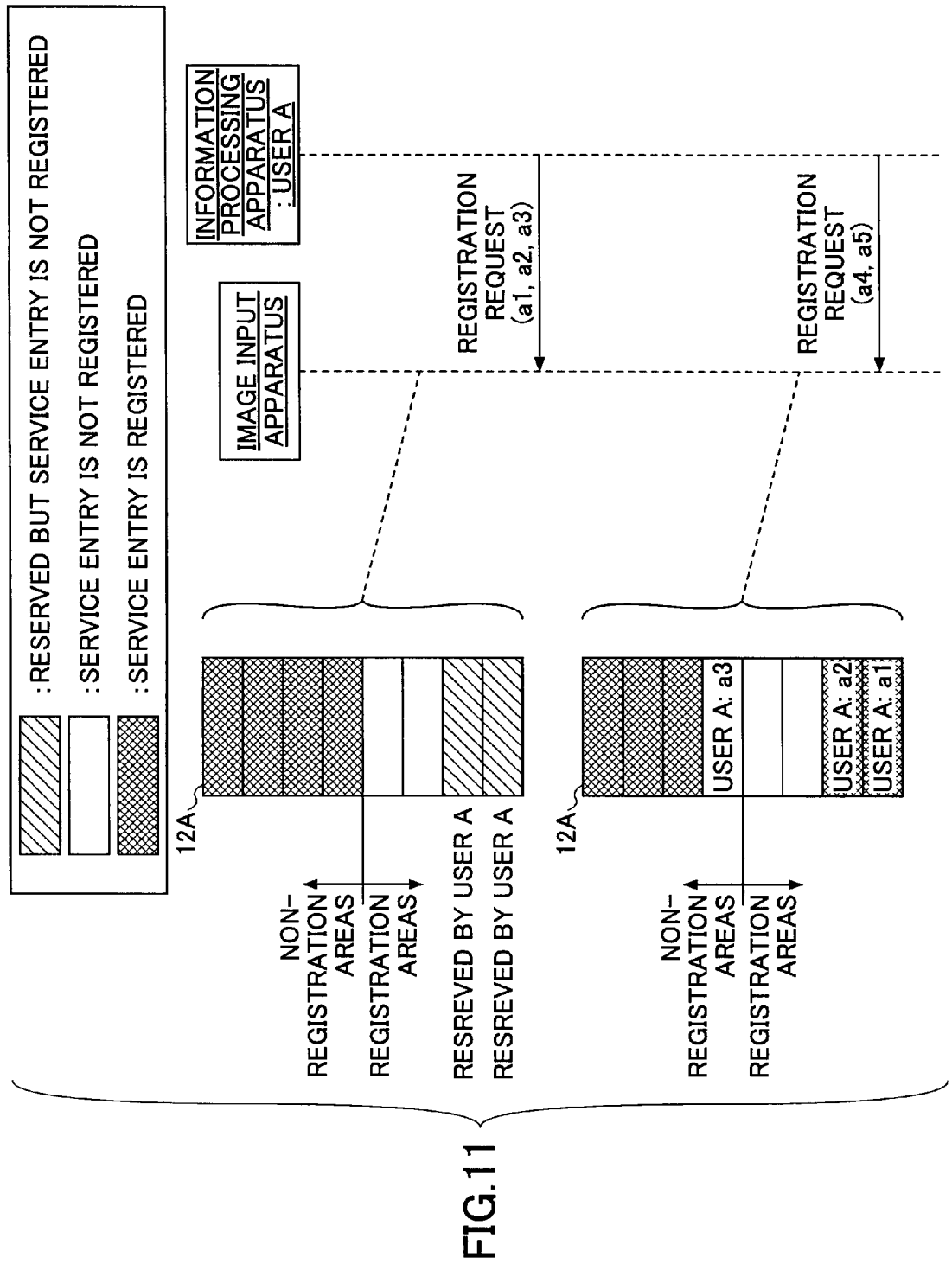
FIG. 11 is a drawing illustrating an exemplary process where registration of additional service entries is requested by user A.

FIG. 11 shows another case where deletion of registered service entries is required. FIG. 11 is a drawing illustrating an exemplary process where registration of additional service entries is requested by user A. In the upper example of the service entry storage space 12A shown in FIG. 11, two service entry areas are reserved for service entries a1 and a2 of user A and all non-reservation areas are occupied by service entries.

If user A requests the image input apparatus 1 to register service entries a1 through a3, the service entries a1 and a2 are registered in the reserved service entry areas and the service entry a3 is registered in a service entry area secured by deleting a service entry in a non-reservation area according to predetermined rules.

As a result, the status of the service entry storage space 12A changes as shown by the lower example in FIG. 11.

If user A further requests the image input apparatus 1 to register service entries a4 and a5, the image input apparatus 1 secures service entry areas for the service entries a4 and a5. In this case, the method of securing service entry areas differs depending on whether reserved service entry areas are assigned to the respective users or to the respective service entries.

When reserved service entry areas are assigned to the respective users, the image input apparatus 1 deletes service entries registered in the reserved service entry areas (empties the reserved service entry areas) of user A and preferentially registers the service entries a4 and a5 (newly requested service entries) in the emptied service entry areas. When reserved service entry areas are assigned to the respective service entries, the image input apparatus 1 deletes registered service entries (empties service entry areas) and registers the service entries a4 and a5 in the emptied service entry areas.

For example, the image input apparatus 1 deletes registered service entries in one of the following patterns:

Deletes the service entries a1 and a2 registered in the reserved service entry areas and also deletes the service entry a3 registered in the non-reservation area.

Deletes the service entry a3 registered in the non-reservation area and deletes the service entry a1 or a2 registered in the reserved service entry area.

Deletes the service entries a1 and a2 registered in the reserved service entry areas.

After the service entries a1 and a2 registered in the reserved service entry areas are deleted, the service entry area reservation unit 15 cancels (releases) the reserved service entry areas so that those areas can be used for other service entries.

Next, a service entry registration process is described in more detail.

<Details of Service Entry Registration Process>

Figure 12:
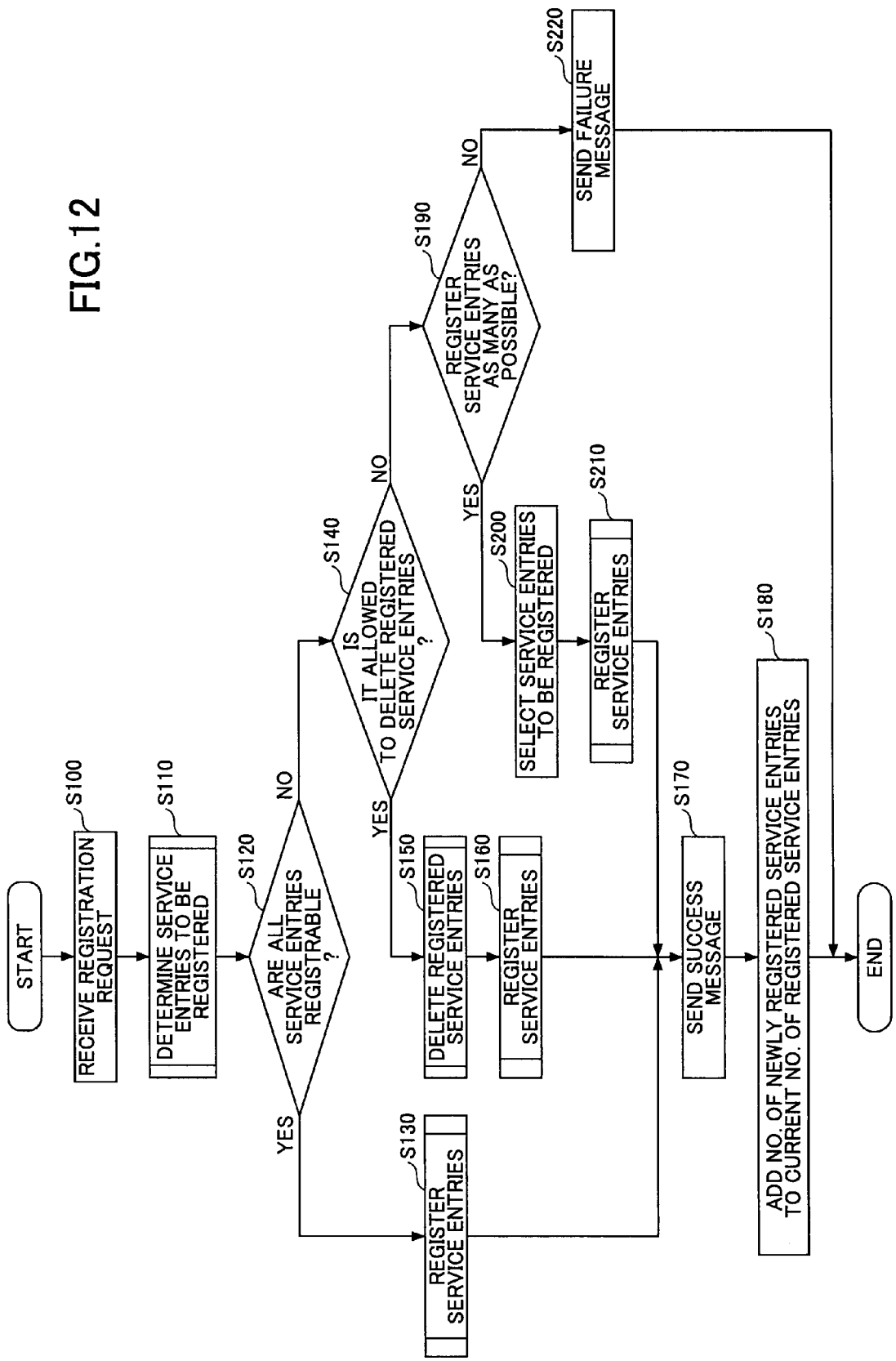
FIG. 12 is a flowchart showing an exemplary service entry registration process performed in response to a registration request from an information processing apparatus.

FIG. 12 is a flowchart showing an exemplary service entry registration process performed in response to a request from the information processing apparatus 20. The process shown in FIG. 12 corresponds to the steps (S30) surrounded by the dotted line A in FIG. 7.

In FIG. 12, the image input apparatus 1 receives a registration request from the information processing apparatus 20 (S100). Then, the service entry determining unit 4 of the image input apparatus 1 compares service entries specified in the registration request with registered service entries to determine service entries to be registered (S110). This comparison sub-process is described later in more detail with reference to FIG. 13. Step S110 is provided to prevent already registered service entries from being registered again.

After step S110, the service entry determining unit 4 determines whether all of the determined service entries can be registered without deleting currently registered service entries (S120). By the way, when reserved service entry areas are assigned to the respective service entries, the image input apparatus 1 registers service entries with reserved service entry areas in their respective reserved service entry areas and registers remaining service entries in the registration request in non-reservation areas. On the other hand, when reserved service entry areas are assigned to the respective users, the image input apparatus 1 registers some of the service entries in the registration request in reserved service entry areas and other service entries in the registration request in non-reservation areas.

In the remaining steps of FIG. 12, it is assumed that registered service entry areas are assigned to the respective service entries. However, basically, the steps may also be applied to a case where reserved service entry areas are assigned to the respective users.

If enough service entry areas are available in the non-registration areas of the service entry storage space 12A to register service entries other than those to be registered in reserved service entry areas (YES in step S120), the service entry update unit 6 registers the determined service entries (S130).

If enough service entry areas are not available in the non-registration areas to register service entries other than those to be registered in reserved service entry areas (NO in step S120), the service entry deleting unit 2 of the image input apparatus 1 determines whether it is allowed to delete some of registered service entries to empty the service entry areas (S140).

If it is allowed to delete some of registered service entries (YES in step S140), the service entry deleting unit 2 deletes some of registered service entries (S150). This deletion sub-process is described later in more detail with reference to FIG. 14. After some of registered service entries are deleted, the service entry update unit 6 registers the determined service entries (S160). This registration sub-process is described later in more detail with reference to FIG. 15.

If it is not allowed to delete registered service entries (NO in step S140), the service entry update unit 6 determines whether to register the determined service entries as many as possible (as many as available service entry areas allow) (S190).

If the service entry update unit 6 registers as many service entries as possible, actually registered service entries and information on registered service entries that the information processing apparatus 20 maintains become inconsistent. Since this is not preferable in some circumstances, the service entry update unit 6 determines whether to register as many service entries as possible in step S190.

If YES in step S190, the service entry update unit 6 selects service entries to be registered from the determined service entries (S200). The information referred to by the service entry deleting unit 2 in step S140 to determine whether it is allowed to delete registered service entries and the information referred to by the service entry update unit 6 in step S190 to determine whether to register as many service entries as possible are set by a user or an administrator of the image input apparatus 1.

After step S200, the service entry update unit 6 registers the selected service entries. This registration sub-process is described later in more detail with reference to FIG. 15. For example, the service entry update unit 6 registers service entries in the order they are specified in the registration request.

If NO in step S190, the service entry determining unit 4 sends a failure message to the information processing apparatus 20 (S220).

Meanwhile, if service entries are successfully registered in step S130, S160, or S210, the service entry determining unit 4 sends a success message to the information processing apparatus 20 (S170).

After step S170, the service entry update unit 6 adds the number of newly registered service entries to the current number of registered service entries (S180).

<Comparison Sub-Process>

Figure 13:
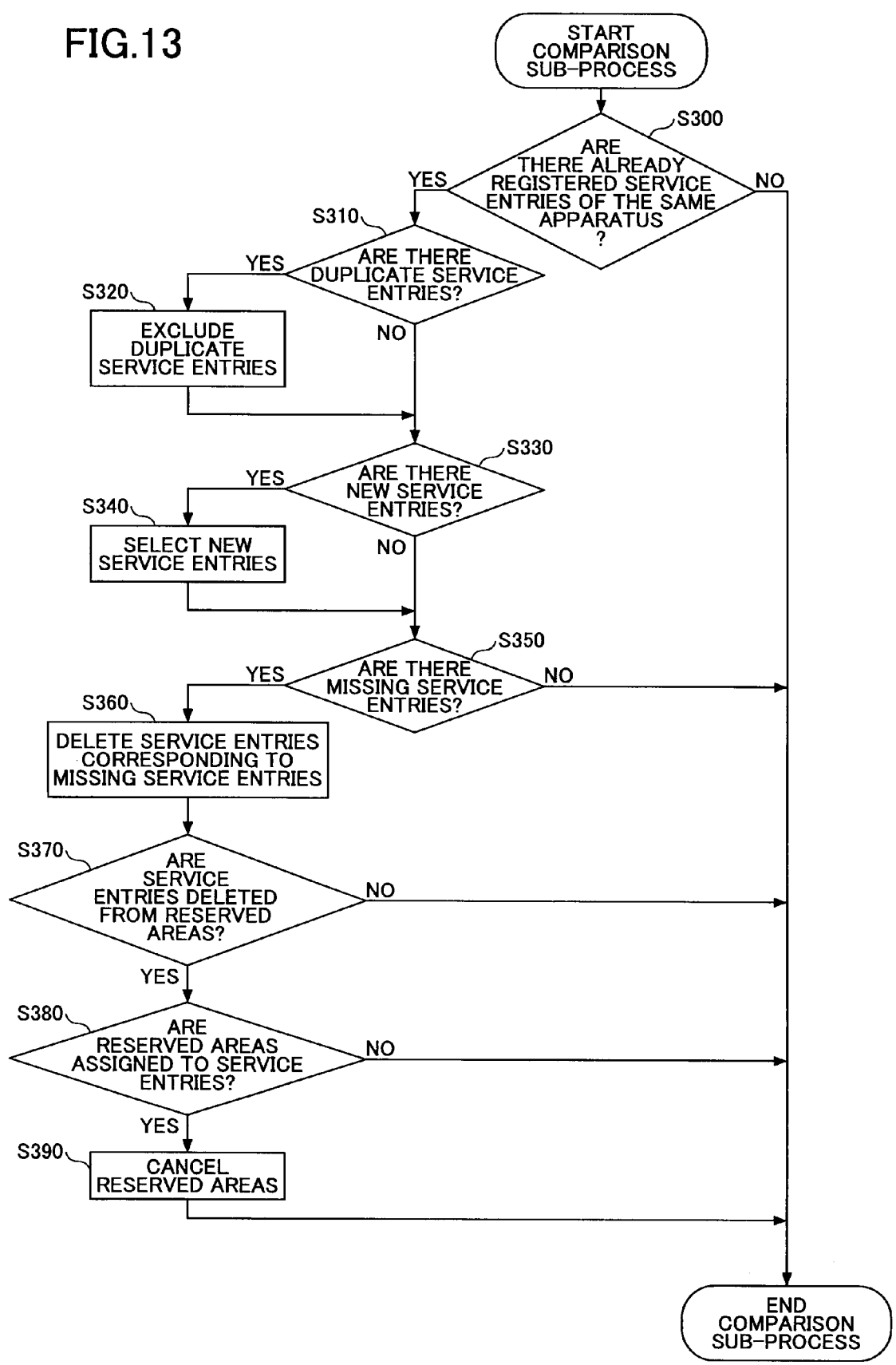
FIG. 13 is a flowchart showing an exemplary process of determining whether service entries in a registration request are already registered.

A comparison sub-process performed in step S110 of FIG. 12 is described below in more detail with reference to FIG. 13.

The service entry determining unit 4 determines whether registered service entries of the requesting information processing apparatus 20 are present in the image input apparatus 1 (S300). If no registered service entry of the information processing apparatus 20 is present in the image input apparatus 1 (No in step S300), the service entry determining unit 4 terminates the comparison sub-process.

If registered service entries of the information processing apparatus 20 are present in the image input apparatus 1 (YES in step S300), the service entry determining unit 4 compares the service entries specified in the registration request with the registered service entries and thereby determines whether the registration request includes "duplicate" service entries that are already registered (S310). For example, if service entries a1, a2, and a3 are already registered in the image input apparatus 1 and the registration request includes service entries a1, a2, and a4, the service entry determining unit 4 determines that the service entries a1 and a2 are duplicate service entries.

If the registration request includes duplicate service entries (YES in step S310), the service entry determining unit 4 excludes the duplicate service entries from the service entries to be registered (S320). In the above example, the service entries a1 and a2 are excluded.

Alternatively, the image input apparatus 1 may be configured to replace registered service entries with the corresponding duplicate service entries. In this case, the image input apparatus 1 deletes the registered service entries and registers the duplicate service entries in place of the registered service entries. This method makes it possible to update the contents of registered service entries and thereby to immediately use modified service entries.

After step S320, the service entry determining unit 4 determines whether the registration request includes new service entries (S330). In the above example, the service entry a4 is the new service entry. The service entry determining unit 4 selects the new service entries as the service entries to be registered (S340).

Next, the service entry determining unit 4 determines whether there are missing service entries (that are registered in the image input apparatus 1 but are not present in the registration request) (S330). If there are missing service entries, the service entry determining unit 4 deletes registered service entries corresponding to the missing service entries from the service entry storage space 12A (S360). In the above example, the service entry a3 is the missing service entry. In other words, the service entry determining unit 4 deletes registered service entries of the information processing apparatus 20 that are not in the current registration request.

Then, the service entry determining unit 4 determines whether the service entries corresponding to the missing service entries have been deleted from reserved service entry areas (S370). For example, the service entry determining unit 4 determines whether the service entry a3 has been deleted from a reserved service entry area.

If the service entries have been deleted from reserved service entry areas (YES in step S370), the service entry determining unit 4 determines whether reserved service entry areas are assigned to the respective service entries (or to the respective users) (S380).

If reserved service entry areas are assigned to the respective service entries (YES in step S380), the service entry area reservation unit 15 cancels (releases) the reserved service entry areas of the deleted service entries (S390). If reserved service entry areas are assigned to the respective users (NO in step S380), the service entry area reservation unit 15 does not cancel (release) the reserved service entry areas of the deleted service entries.

Alternatively, the image input apparatus 1 may be configured not to cancel the reserved service entry areas of the deleted service entries in step S390 to allow the user to manually register service entries in the reserved service entry areas.

<Deletion Sub-Process>

A deletion sub-process performed in step S150 of FIG. 12 is described below in more detail with reference to FIG. 14. In the deletion sub-process, some of the registered service entries in non-reservation areas are deleted to empty the non-reservation areas to register service entries in a registration request other than those to be registered in reserved service entry areas. In this embodiment, the service entry deleting unit 2 of the image input apparatus 1 is configured to delete least recently used service entries in non-reservation areas. This mechanism makes it possible to efficiently use the service entry storage space 12A and thereby to better meet user needs.

Figure 14:
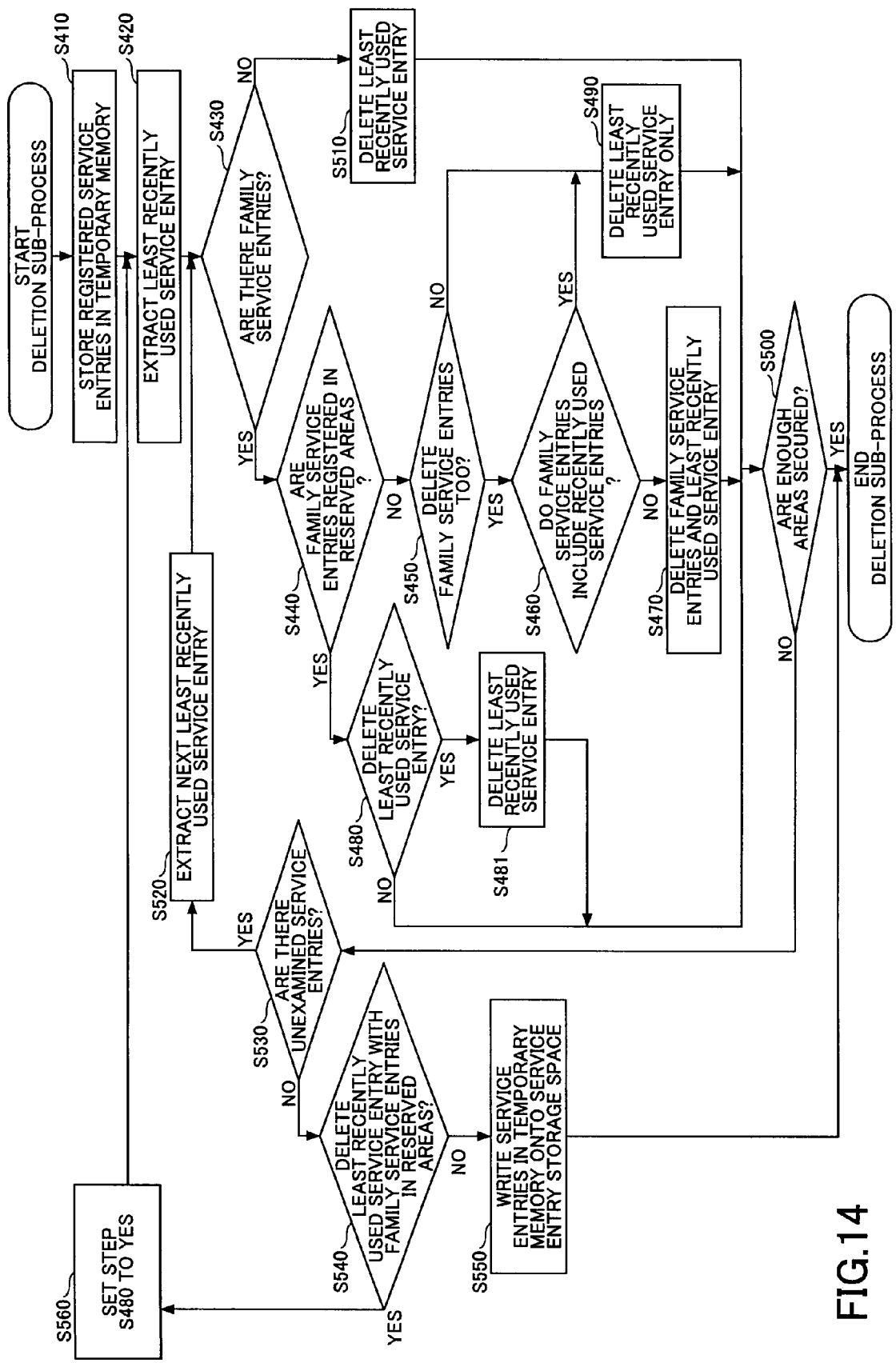
FIG. 14 is a flowchart showing an exemplary process of deleting service entries.

In FIG. 14, the service entry deleting unit 2 stores service entries currently registered in the service entry storage area 12A in a temporary memory (S410).

Then, the service entry deleting unit 2 extracts the least recently used service entry from the service entries in the temporary memory based on last accessed dates (S420). Meanwhile, it is possible that there are other service entries in addition to the extracted least recently used service entry registered at the same time by the same information processing apparatus 20. Steps S430, S450, and S460 are provided to determine whether to delete the service entries registered at the same time as the extracted least recently used service entry.

After step S420, the service entry deleting unit 2 determines whether there are other service entries in addition to the extracted least recently used service entry registered by the same information processing apparatus 20 (S430). For example, if the least recently used service entry has been registered by an information processing apparatus 20A, the service entry deleting unit 2 determines whether there are other service entries registered by the information processing apparatus 20A. In the descriptions below, the other service entries registered by the same information processing apparatus 20 are called "family" service entries.

It is highly likely that family service entries registered by the same information processing apparatus 20 as the least recently used service entry are registered at the same time. There are cases where it is preferable to delete the family service entries together with the least recently used service entry in terms of processing at the information processing apparatus 20.

If there is no family service entry (NO in step S430), the service entry deleting unit 2 deletes only the least recently used service entry (S510).

If there are family service entries (YES in step S430), the service entry deleting unit 2 determines whether the family service entries are registered in reserved service entry areas (S440).

If the family service entries are registered in reserved service entry areas (YES in step S440), the service entry deleting unit 2 determines whether to delete the least recently used service entry (S480). Step S480 makes it possible not to delete the least recently used service entry if the family service entries are registered in reserved service entry areas.

If YES in step S480, the service entry deleting unit 2 deletes the least recently used service entry (S481). In this case, only the least recently used service entry is deleted and the family entries registered in reserved service entry areas are not deleted. Although this method causes inconsistency between actually registered service entries and information on registered service entries that the information processing apparatus 20 maintains, it makes it easier for the image input apparatus 1 to secure service entry areas for new service entries. Also, even if the family service entries in reserved service entry areas are deleted, other users (or other information processing apparatuses 20) cannot use the reserved service entry areas. Therefore, this method does not cause much harm. The information referred to by the service entry deleting unit 2 in step S480 to determine whether to delete the least recently used service entry is set by a user or an administrator of the image input apparatus 1.

If the family service entries are registered in non-reservation areas (NO in step S440), the service entry deleting unit 2 determines whether to delete the family service entries together with the least recently used service entry (S450). Deleting the family service entries together with the least recently used service entry prevents inconsistency between actually registered service entries and information on registered service entries that the information processing apparatus 20 maintains. The information referred to by the service entry deleting unit 2 in step S450 to determine whether to delete the family service entries together with the least recently used service entry is set by a user or an administrator of the image input apparatus 1.

If NO in step S450, the service entry deleting unit 2 deletes only the least recently used service entry (S490).

If YES in step S450, the service entry deleting unit 2 determines whether the family service entries include recently used service entries (S460). For example, the service entry deleting unit 2 determines whether the family service entries have been used within a predetermined period of time, or determines whether the family service entries are in the top five most recently used service entries by sorting registered service entries in descending order of last accessed dates.

If there are no recently used service entries in the family service entries (NO in step S460), the service entry deleting unit 2 deletes all the family service entries together with the least recently used service entry (S470).

In step S470, the family service entries are deleted even if there are registered service entries in the image input apparatus 1 that are used less recently than the family service entries. This is because deleting the family service entries together with the least recently used service entry is preferable in terms of processing at the information processing apparatus 20.

If there are recently used service entries in the family service entries (YES in step S460), the service entry deleting unit 2 deletes only the least recently used service entry (S490). Step S460 makes it possible to leave recently used service entries in the image input apparatus 1.

After step S480, S481, S470, S490, or S510, the service entry deleting unit 2 determines whether enough service entry areas have been secured in the service entry storage space 12A (S500). The number of necessary service entry areas is obtained in the comparison sub-process shown in FIG. 13.

If enough service entry areas have not been secured yet (NO in step S500), the service entry deleting unit 2 repeats the steps described above.

More specifically, the service entry deleting unit 2 goes to step S530 and determines whether there are service entries left in the non-reservation areas which service entries have not been examined yet in the above steps (S530). If there are unexamined service entries (YES in step S530), the service entry deleting unit 2 extracts the next least recently used service entry from the unexamined service entries (S520), and repeats step S430 and subsequent steps.

If there is no unexamined service entry (NO in step S530), the service entry deleting unit 2 determines whether to delete the least recently used service entry that has been registered by the same information processing apparatus 20 together with the family service entries that are present in reserved service entry areas (S540). This step makes it possible to delete the least recently used service entry that has been registered together with the family service entries present in reserved service entry areas and that has not been deleted in step S481 (NO in step S480). The information referred to by the service entry deleting unit 2 in step S540 to determine whether to delete the least recently used service entry is set by a user or an administrator of the image input apparatus 1.

If YES in step S540, the service entry deleting unit 2 goes to step S560 and sets the decision at step S480 to YES. Then, the service entry deleting unit 2 repeats step S420 and subsequent steps.

If NO in step S540, the service entry deleting unit 2 determines that it is not possible to secure enough service entry areas, and writes the service entries stored in the temporary memory back into the service entry storage space 12A to nullify the results of the above steps (S550).

After the deletion sub-process described above, the process goes to step S160 shown in FIG. 12 regardless of whether enough service entry areas have been secured. If enough service entry areas have not been secured, a preferable approach in step S160 is to register as many service entries as possible.

<Registration Sub-Process>

Figure 15:
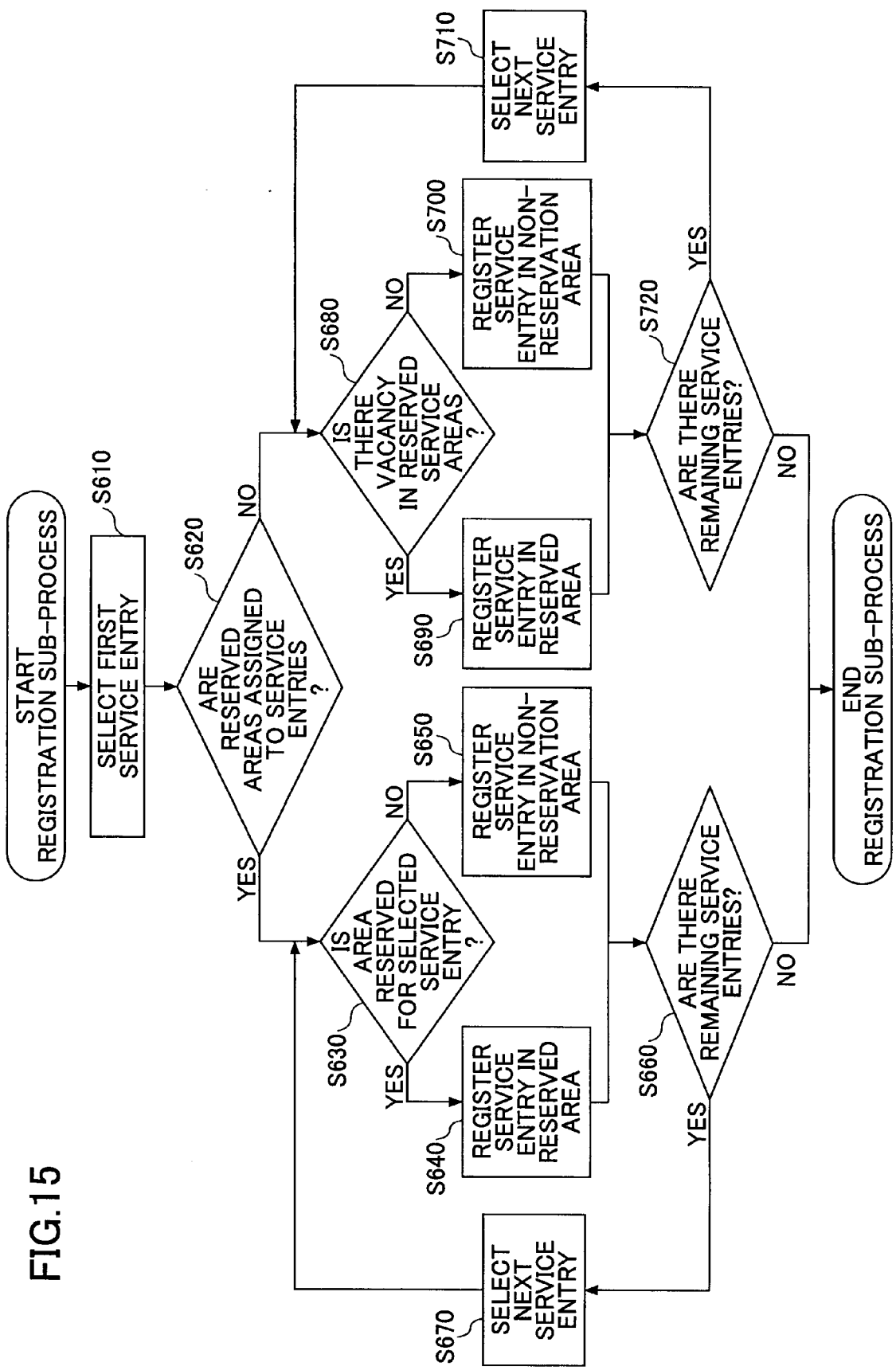
FIG. 15 is a flowchart showing an exemplary process of registering service entries.
Figure 16:
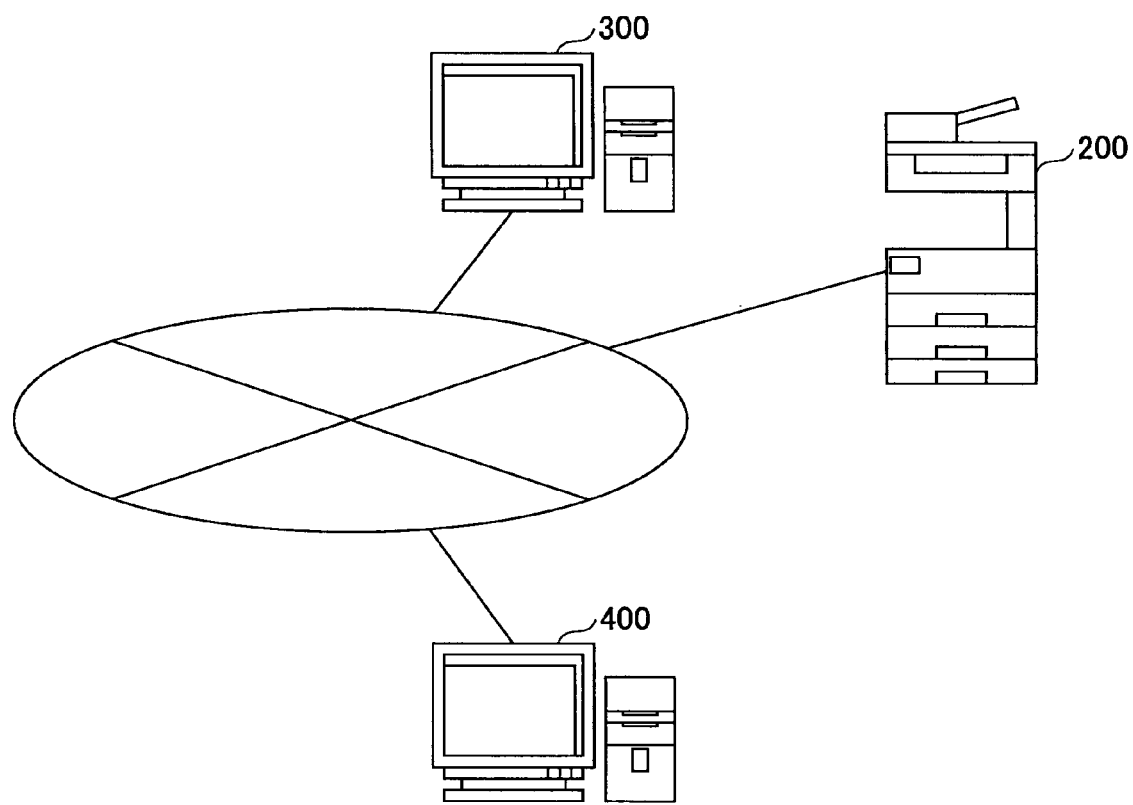
FIG. 16 is a drawing illustrating a configuration of an exemplary conventional network scanner system.

A registration sub-process is described below in more detail with reference to FIG. 15.

If there are multiple service entries to be registered, the service entry update unit 6 registers the service entries one by one. In FIG. 15, the service entry update unit 6 selects a first one of the service entries to be registered (S610).

Then, the service entry update unit 6 determines whether reserved service entry areas are assigned to the respective service entries (or to the respective users) (S620).

If reserved service entry areas are assigned to the respective service entries (YES in step S620), the service entry update unit 6 determines whether a service entry area is reserved for the service entry to be registered (S630). If a service entry area is reserved (YES in step S630), the service entry update unit 6 registers the service entry in the reserved service entry area (S640).

If no service entry area is reserved (NO in step S630), the service entry update unit 6 registers the service entry in a non-reservation area (S650).

Thus, step S630 makes it possible to register service entries preferentially in registered service entry areas and thereby to effectively use non-reservation areas.

Then, the service entry update unit 6 determines whether there are remaining service entries to be registered (S660). If there are remaining service entries to be registered (YES in step S660), the service entry update unit 6 selects a next one of the service entries to be registered (S670) and repeats steps S630, S640/S650, and S660.

If reserved service entry areas are assigned to the respective users (NO in step S620), the service entry update unit 6 determines whether there is a vacancy in the reserved service entry areas of the user (S680). If there is a vacancy (YES in step S680), the service entry update unit 6 registers the service entry in one of the reserved service entry areas of the user (S690). If there is no vacancy (NO in step S680), the service entry update unit 6 registers the service entry in a no-reservation area (S700).

Thus, step S680 makes it possible to register service entries preferentially in reserved service entry areas. Registering service entries preferentially in reserved service entry areas makes it possible to reduce the possibility of a service entry having been deleted when the user wants to use it.

Also, registering service entries preferentially in reserved service entry areas makes it possible to register more service entries of a user having no reserved service entry area in no-registration areas, and thereby makes it easier for the image input apparatus 1 to secure service entry areas for service entries without reserved service entry areas.

In other words, this approach reduces the chance of having to delete currently registered service entries to register new service entries for which service entry areas are not reserved.

After step S690 or S700, the service entry update unit 6 determines whether there are remaining service entries to be registered (S720). If there are remaining service entries to be registered (YES in step S720), the service entry update unit 6 selects a next one of the service entries to be registered (S710) and repeats steps S680, S690/S700, and S720.

If enough service entry areas are available or have been secured in step S150 or S200 of FIG. 12, all of the service entries determined in step S110 of FIG. 12 are registered through the registration sub-process described above.

As described above, the image input apparatus 1 according to an embodiment of the present invention makes it possible to reserve service entry areas and to preferentially register service entries in the reserved service entry areas. This configuration makes it possible for the information processing apparatus 20 to unfailingly register desired service entries in the image input apparatus 1. According to an embodiment of the present invention, the image input apparatus 1, before deleting a selected service entry to empty a service entry area in the service entry storage space 12A, determines whether family service entries of the selected service entry are registered in reserved service entry areas. If the family service entries are registered in reserved service entry areas, the image input apparatus 1 can choose not to delete both the family service entries and the selected service entry. This approach prevents occurrence of inconsistency between actually registered service entries and information on registered service entries that the information processing apparatus 20 maintains.

Also, the image input apparatus 1 can choose to delete the selected service entry even if the family service entries are registered in reserved service entry areas when it is difficult to secure a service entry area for a new service entry.

If the family service entries are registered in non-reservation areas, the image input apparatus 1 deletes the selected service area and/or the family service areas. This approach makes it easier to secure service entry areas in the service entry storage space 12A for new service entries.

Embodiments of the present invention provide an image input apparatus and an information registration method that make it possible to register multiple sets of information in a memory of the image input apparatus by one request from an information processing apparatus connected via a network and to efficiently manage information registered in the memory by multiple information processing apparatuses.

The present invention is not limited to the specifically disclosed embodiments, and variations and modifications may be made without departing from the scope of the present invention.

The present application is based on Japanese Priority Application No. 2007-050670, filed on Feb. 28, 2007, the entire contents of which are hereby incorporated herein by reference.

What is claimed is:

1. An image input apparatus for inputting image data connected via a network to one or more information processing apparatuses and capable of registering multiple service entries at once according to a registration request sent from any one of the information processing apparatuses, the image input apparatus comprising:

a service entry storage space configured to store the service entries, each of the service entries including a display name and destination information for the image data to be sent; and a processor configured to reserve service entry areas in the service entry storage space, register the service entries in the reserved service entry areas if the reserved service entry areas have available area to store the service entries, and register the service entries in non-reservation areas of the service entry storage space if the reserved service entry areas do not have available area to store the service entries, wherein a maximum number of reservable service entry areas is set for each of the information processing apparatuses or for the image input apparatus, reserved service entry areas are assigned to the respective service entries in response to the maximum number of reservable service entry areas being set for the image input apparatus, and service entries of an information processing apparatus are deleted when the information processing apparatus fails to send an extension request within a predetermined period of time.

2. The image input apparatus as claimed in claim 1, wherein the processor is configured to reserve one or more of the service entry areas for each of the information processing apparatuses.

3. The image input apparatus as claimed in claim 1, wherein the processor is further configured a) to extract a least recently used service entry from registered service entries in the non-reservation areas if service entry areas do not have available area to store the service entries specified in the registration request;

b) to delete the least recently used service entry if one or more family service entries, comprising service entries registered by the same information processing apparatus as the least recently used service entry, are not registered in the reserved service entry areas;

c) to extract a next least recently used service entry from the registered service entries in the non-reservation areas as the least recently used service entry and repeat b); and d) to repeat c) until the service entry areas have available area to store the service entries specified in the registration request.

4. The image input apparatus as claimed in claim 1, wherein the processor is further configured a) to extract a least recently used service entry from registered service entries in the non-reservation areas if service entry areas have available area to store the service entries specified in the registration request;

b) to delete the least recently used service entry if one or more family service entries, comprising service entries registered by the same information processing apparatus as the least recently used service entry, are not registered in the reserved service entry areas;

c) to delete the least recently used service entry if the one or more family service entries are registered in the reserved service entry areas;

d) to extract a next least recently used service entry from the registered service entries in the non-reservation areas as the least recently used service entry and repeat b) or c); and e) to repeat d) until the service entry areas have available area to store the service entries specified in the registration request.

5. The image input apparatus as claimed in claim 1, wherein if service entries of one of the information processing apparatuses are registered in the reserved service entry areas in the service entry storage space and the one of the information processing apparatuses requests registration of additional service entries, the processor is further configured to delete the service entries of the one of the information processing apparatuses registered in the reserved service entry areas to empty the reserved service entry areas, and register the additional service entries in the reserved service entry areas emptied.

6. The image input apparatus as claimed in claim 5, wherein the processor is configured to cancel the reserved service entry areas emptied.

7. The image input apparatus as claimed in claim 3, wherein the processor is configured to register as many of the service entries specified in the registration request as possible if the processor is unable to secure the service entry areas having available area to store all of the service entries specified in the registration request.

8. The image input apparatus as claimed in claim 3, wherein if the service entry areas having available area to store all of the service entries specified in the registration request have not been secured by b), the processor is further configured e) to delete the least recently used service entry;

to extract the next least recently used service entry from the registered service entries in the non-reservation areas as the least recently used service entry and repeat e); and g) to repeat f) until the service entry areas have available area to store the service entries specified in the registration request.

9. A method of registering multiple service entries at once in a service entry storage space of an image input apparatus for inputting image data connected via a network to one or more information processing apparatuses according to a registration request from any one of the information processing apparatuses, the method comprising:

reserving service entry areas in the service entry storage space configured to store the service entries, each of the service entries including a display name and destination information for the image data to be sent;

registering the service entries in the reserved service entry areas if the reserved service entry areas have available area to store the service entries or registering the service entries in non-reservation areas of the service entry storage space if the reserved service entry areas do not have the available area to store the service entries;

setting a maximum number of reservable service entry areas for each of the information processing apparatuses or for the image input apparatus;

assigning reserved service entry areas to the respective service entries in response to the maximum number of reservable service entry areas being set for the image input apparatus; and deleting service entries of an information processing apparatus when the information processing apparatus fails to send an extension request within a predetermined period of time.

10. The method as claimed in claim 9, wherein reserving service entry areas in the service entry storage space includes reserving, one or more of the service entry areas for each of the information processing apparatuses.

11. The method as claimed in claim 9, further comprising:

a) extracting a least recently used service entry from registered service entries in the non-reservation areas if the service entry areas have available area in the service entry storage space to store the service entries specified in the registration request;

b) determining whether family service entries, which have been registered by the same information processing apparatus as the least recently used service entry, are registered in the reserved service entry areas;
c) deleting the least recently used service entry if the family service entries are not registered in the reserved service entry areas;
d) extracting a next least recently used service entry from the registered service entries in the non-reservation areas as the least recently used service entry and repeating b) and c); and
e) repeating d) until the service entry areas have available area to store the service entries specified in the registration request.

12. The method as claimed in claim 9, further comprising:
a) extracting a least recently used service entry from registered service entries in the non-reservation areas if service entry areas have available area in the service entry storage space to store service entries specified in the registration request;
b) determining whether family service entries, which have been registered by the same information processing apparatus as the least recently used service entry, are registered in the reserved service entry areas;
c) deleting the least recently used service entry if the family service entries are registered in the reserved service entry areas;
d) extracting a next least recently used service entry from the registered service entries in the non-reservation areas as the least recently used service entry and repeating b) and c); and
e) repeating d) until the service entry areas have available area to store the service entries specified in the registration request.

13. The method as claimed in claim 9, further comprising:
if service entries of one of the information processing apparatuses are registered in the reserved service entry areas in the service entry storage space and the one of the information processing apparatuses requests registration of additional service entries,
deleting the service entries of the one of the information processing apparatuses registered in the reserved service entry areas to empty the reserved service entry areas and
registering the service entries comprises registering the additional service entries in the reserved service entry areas emptied by the deleting.

14. The method as claimed in claim 13, wherein the reserved service entry areas emptied by the deleting are cancelled.

15. The method as claimed in claim 11, wherein registering the service entries comprises registering as many of the service entries specified in the registration request as possible if the service entry areas do not have available area to store all of the service entries specified in the registration request by a) through e).

16. The method as claimed in claim 11, wherein, if the service entry areas do not have available area to store the service entries specified in the registration request by a) through e), the method further comprises:
f) determining whether the family service entries of the least recently used service entry are registered in the reserved service entry areas;
g) deleting the least recently used service entry;
h) extracting the next least recently used service entry from the registered service entries in the non-reservation areas as the least recently used service entry and repeating f) and g); and
i) repeating h) until the service entry areas have available area to store the service entries specified in the registration request.

17. An image input apparatus for inputting image data connected via a network to one or more information processing apparatuses and capable of registering multiple service entries at once according to a registration request sent from any one of the information processing apparatuses, the image input apparatus comprising:
service entry storage means for storing the service entries, each of the service entries including a display name and destination information for the image data to be sent;
means for reserving service entry areas in the service entry storage means; and
means for registering the service entries in the reserved service entry areas if the reserved service entry areas have available area to store the service entries and for registering the service entries in non-reservation areas of the service entry storage means if the reserved service entry areas do not have the available area to store the service entries,
wherein
a maximum number of reservable service entry areas is set for each of the information processing apparatuses or for the image input apparatus, and
reserved service entry areas are assigned to the respective service entries in response to the maximum number of reservable service entry areas being set for the image input apparatus, and
service entries of an information processing apparatus are deleted when the information processing apparatus fails to send an extension request within a predetermined period of time.

18. The image input apparatus as claimed in claim 1, wherein the image input apparatus receives the registration requests at predetermined intervals.

19. The image input apparatus as claimed in claim 1, wherein the information processing apparatus sends a deletion request to the image input apparatus for deleting service entries in response to being shut down.

20. The image input apparatus as claimed in claim 19, wherein in response to receiving the deletion request, all service entries are deleted even when the registered service entries do not match service entries contained in the deletion request.

* * * * *